US012712181B2

(12) United States Patent
Sun et al.

(10) Patent No.: US 12,712,181 B2
(45) Date of Patent: Aug. 18, 2026

(54) CATHODE ACTIVE MATERIAL AND LITHIUM SECONDARY BATTERY COMPRISING SAME

(71) Applicant: IUCF-HYU (INDUSTRY-UNIVERSITY COOPERATION FOUNDATION HANYANG UNIVERSITY), Seoul (KR)

(72) Inventors: Yang-Kook Sun, Seoul (KR); Geon-Tae Park, Seoul (KR)

(73) Assignee: IUCF-HYU (INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 966 days.

(21) Appl. No.: 17/293,251

(22) PCT Filed: Nov. 13, 2019

(86) PCT No.: PCT/KR2019/015383
§ 371 (c)(1),
(2) Date: May 12, 2021

(87) PCT Pub. No.: WO2020/101331
PCT Pub. Date: May 22, 2020

(65) Prior Publication Data

US 2022/0020982 A1 Jan. 20, 2022

(30) Foreign Application Priority Data

Nov. 13, 2018 (KR) ........................ 10-2018-0138587
Nov. 12, 2019 (KR) ........................ 10-2019-0144342

(51) Int. Cl.
*H01M 4/525* (2010.01)
*H01M 4/02* (2006.01)
*H01M 4/36* (2006.01)
*H01M 4/505* (2010.01)
*H01M 10/0525* (2010.01)

(52) U.S. Cl.
CPC ........... *H01M 4/525* (2013.01); *H01M 4/366* (2013.01); *H01M 4/505* (2013.01);
(Continued)

(58) Field of Classification Search
CPC ...... H01M 4/525; H01M 4/366; H01M 4/505; H01M 10/0525; H01M 2004/028; H01M 2220/20
See application file for complete search history.

(56) References Cited

U.S. PATENT DOCUMENTS 10,797,318 B2 10/2020 Sun et al.
2010/0209771 A1* 8/2010 Shizuka ............. H01M 4/5815 429/231.95

(Continued)

FOREIGN PATENT DOCUMENTS

CN 101106194 A * 1/2008
CN 103620833 A 3/2014

(Continued)

OTHER PUBLICATIONS

International Search Report for PCT/KR2019/015383 dated, Feb. 25, 2020 (PCT/ISA/210).

*Primary Examiner* — Ula C Ruddock
*Assistant Examiner* — Olivia Mason Ruggiero
(74) *Attorney, Agent, or Firm* — Sughrue Mion, PLLC

(57) ABSTRACT

Provided is a positive active material for a lithium secondary battery, the positive active material including: a secondary particle comprising a group of a plurality of primary particles, in which the primary particles comprise first primary particles provided on a surface portion of the secondary
(Continued)

particle and each having a spinel structure at an end thereof, and the primary particle is made of lithium (Li), nickel (Ni), manganese (Mn), and tungsten (W) which is a doping element.

15 Claims, 15 Drawing Sheets

(52) U.S. Cl.
CPC .. *H01M 10/0525* (2013.01); *H01M 2004/028* (2013.01); *H01M 2220/20* (2013.01)

(56) References Cited

U.S. PATENT DOCUMENTS

2013/0178809 A1* 7/2013 Nagai .................... A61M 1/84 604/319
2013/0224591 A1* 8/2013 Kishimi ................ H01M 4/133 174/126.2
2014/0045067 A1* 2/2014 Cho .................. C01G 45/1235 429/231.95
2014/0106228 A1* 4/2014 Toya .................... H01M 4/525 429/223
2016/0315312 A1* 10/2016 Tamura ................ H01M 4/623
2017/0222221 A1* 8/2017 Park ..................... H01M 4/366
2019/0044142 A1 2/2019 Sun et al.

FOREIGN PATENT DOCUMENTS

KR 10-2012-0121235 A 11/2012
KR 10-2014-0119621 A 10/2014
KR 20160023423 A * 3/2016
KR 10-2016-0049995 A 5/2016
KR 10-2017-0115939 A 10/2017
WO 2017/175979 A2 10/2017

* cited by examiner

[FIG. 1]
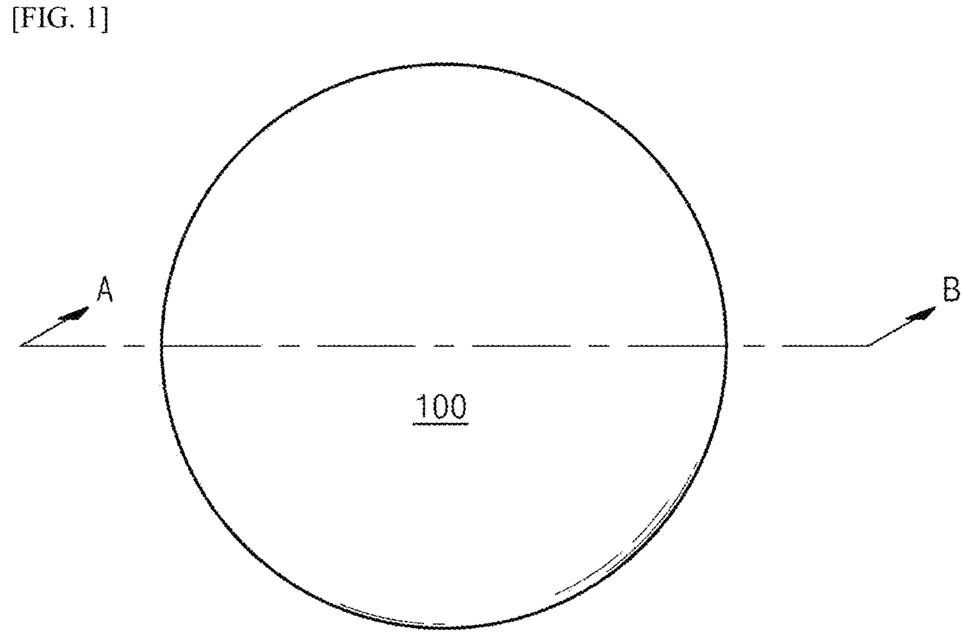

[FIG. 2]
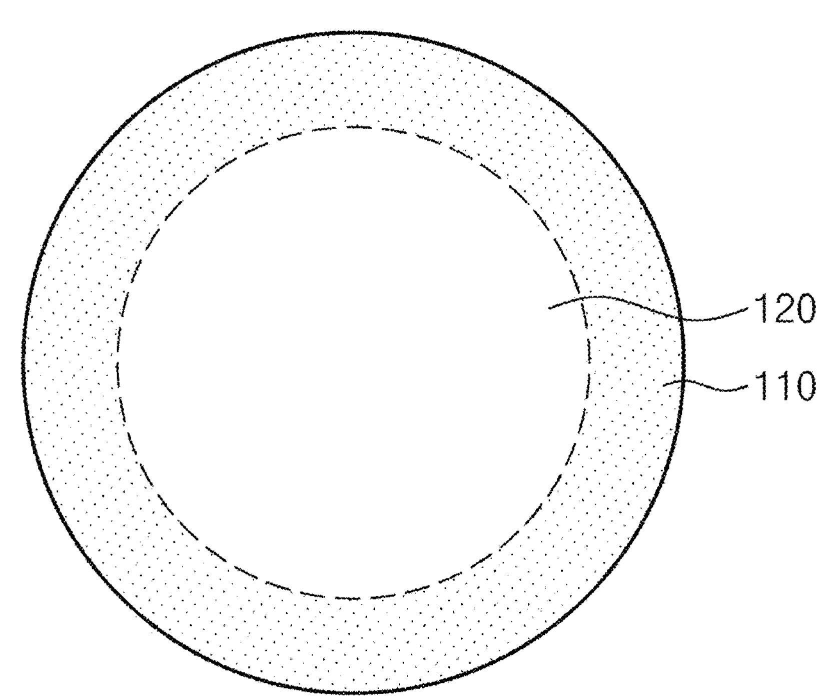

[FIG. 3]
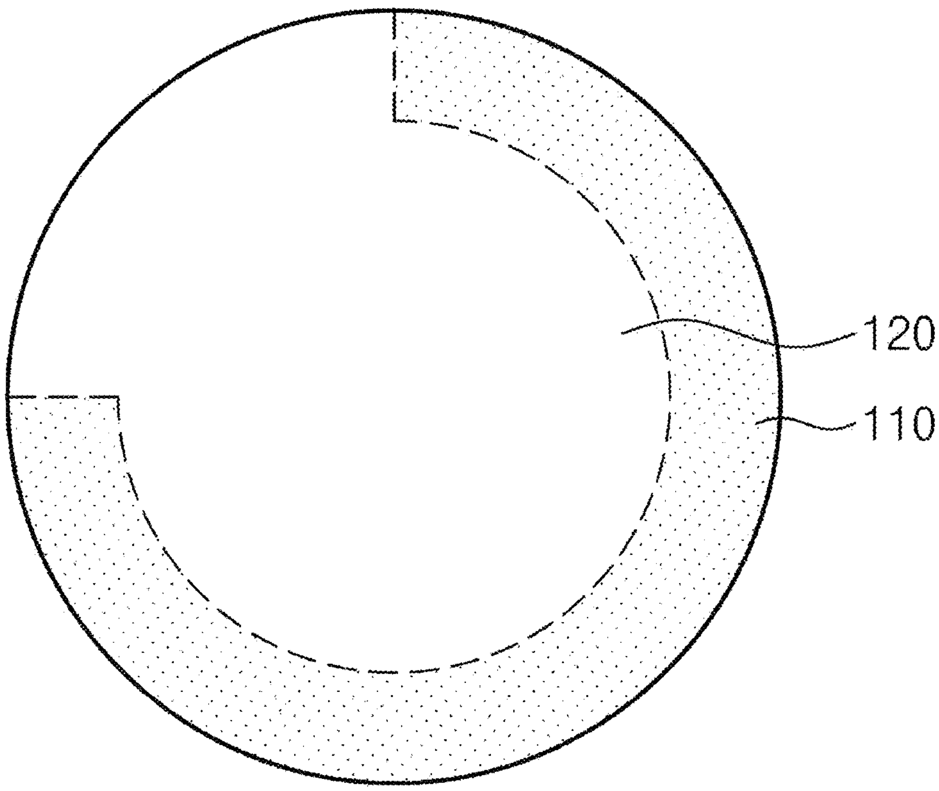

[FIG. 4]
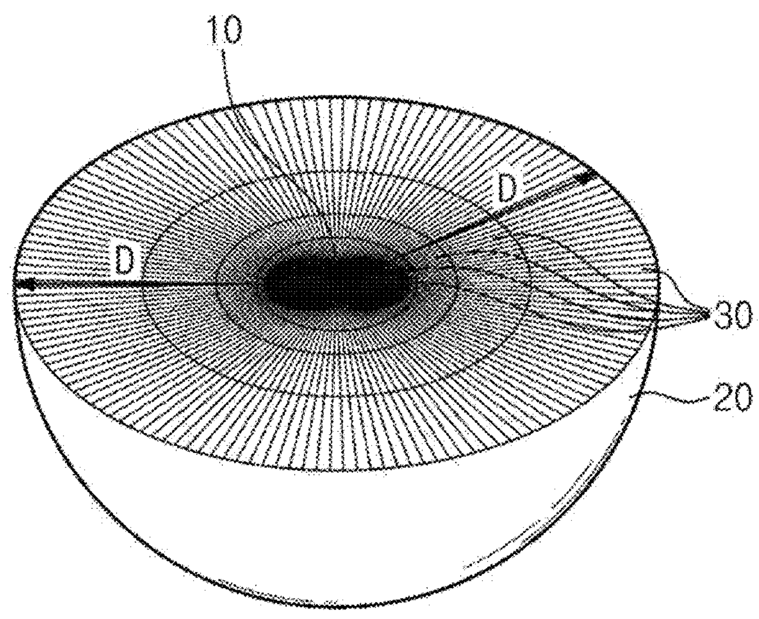
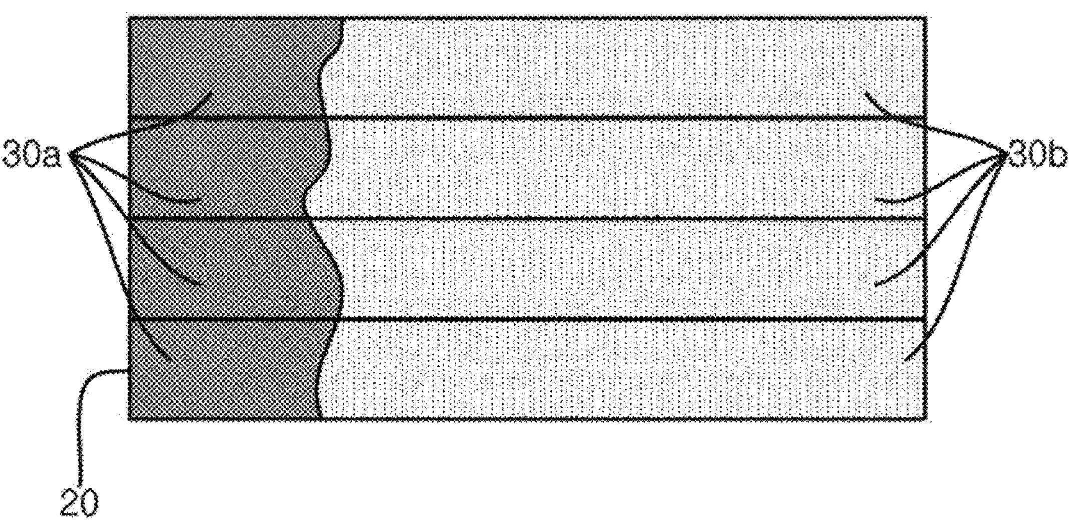

[FIG. 5]
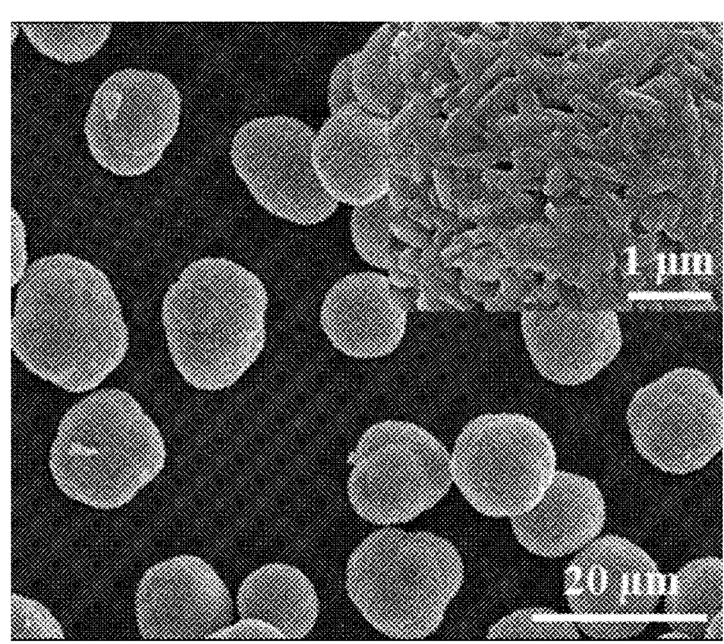

[FIG. 6]
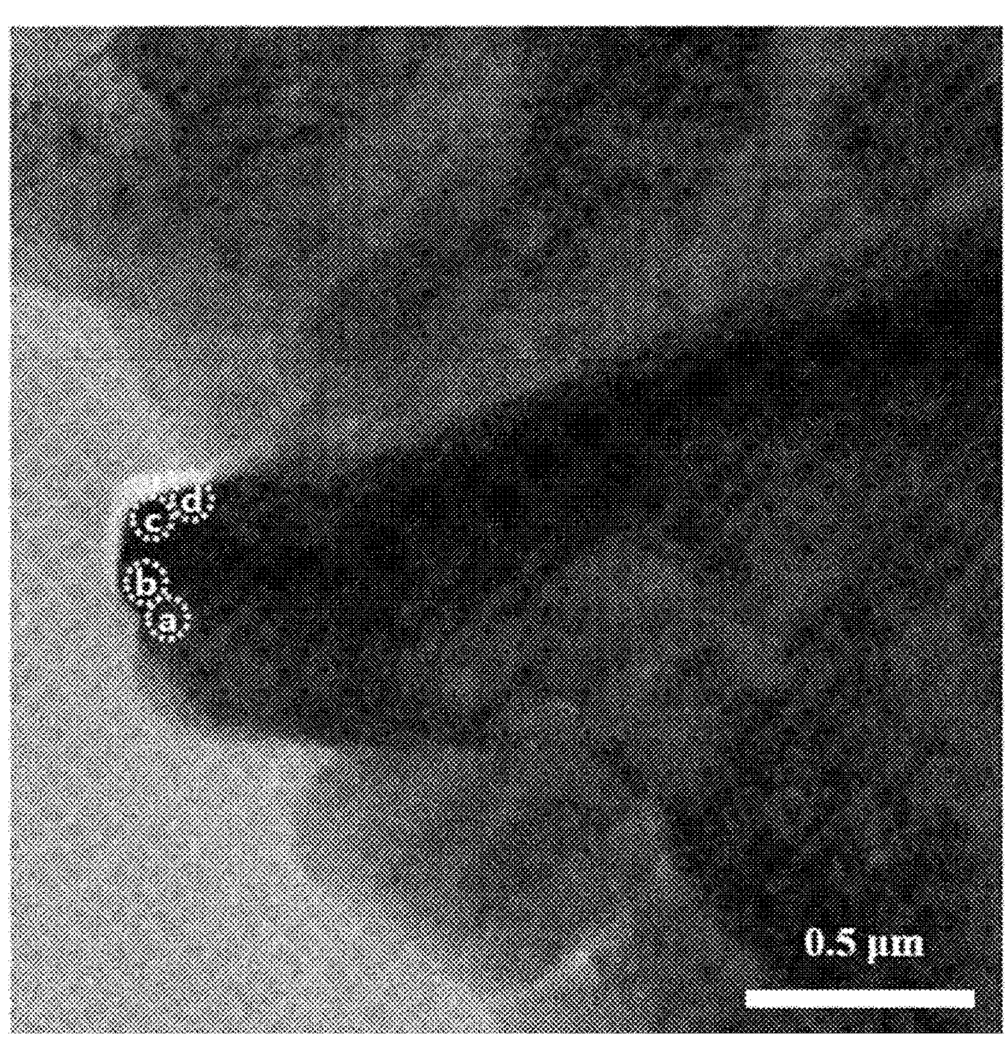

[FIG. 8]
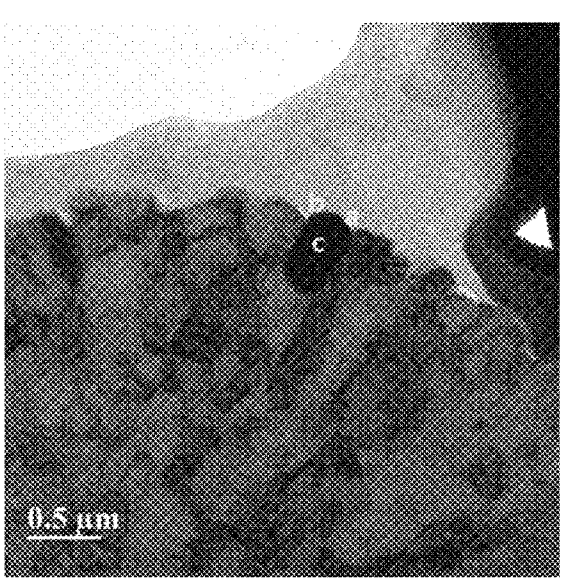

[FIG. 9]
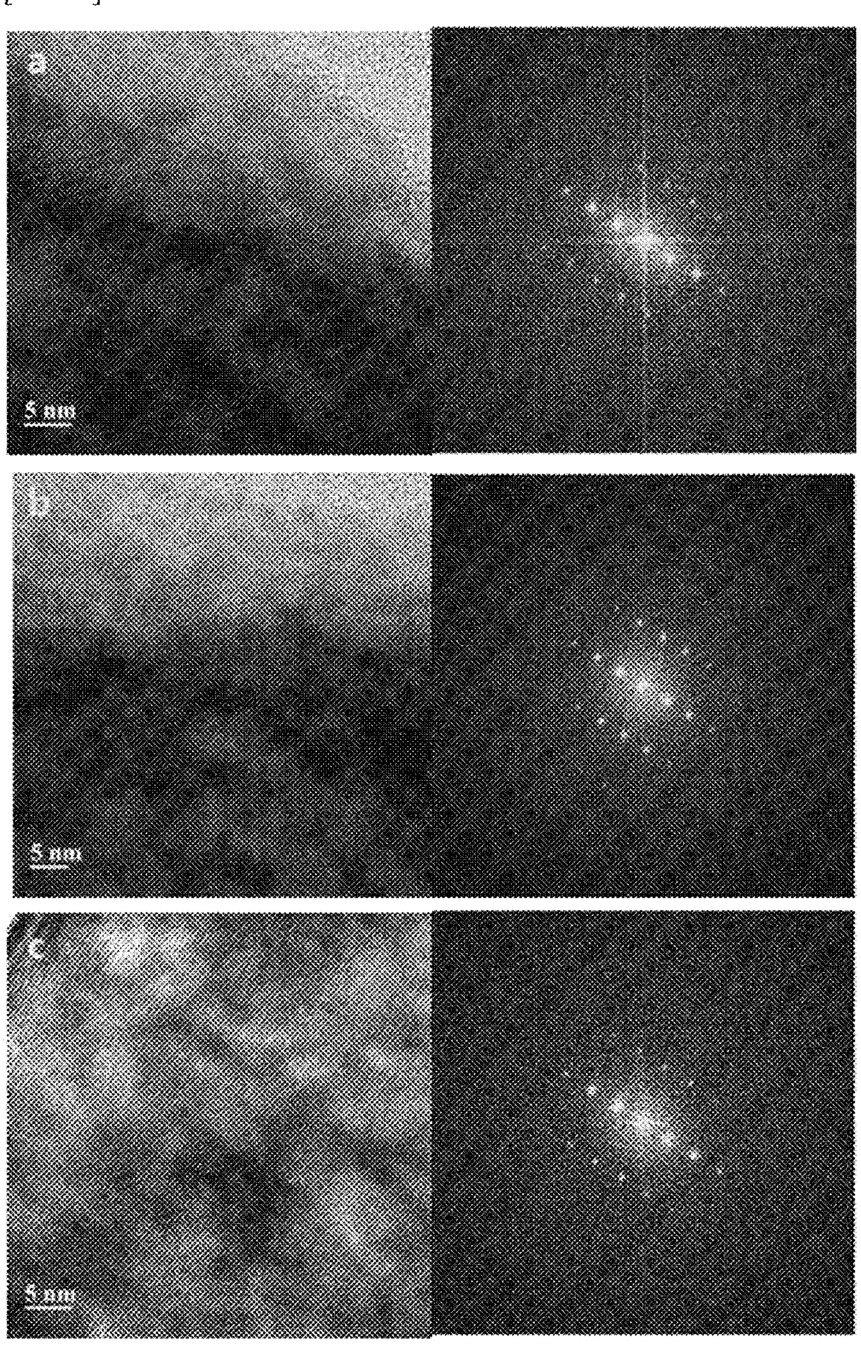

[FIG. 10A]
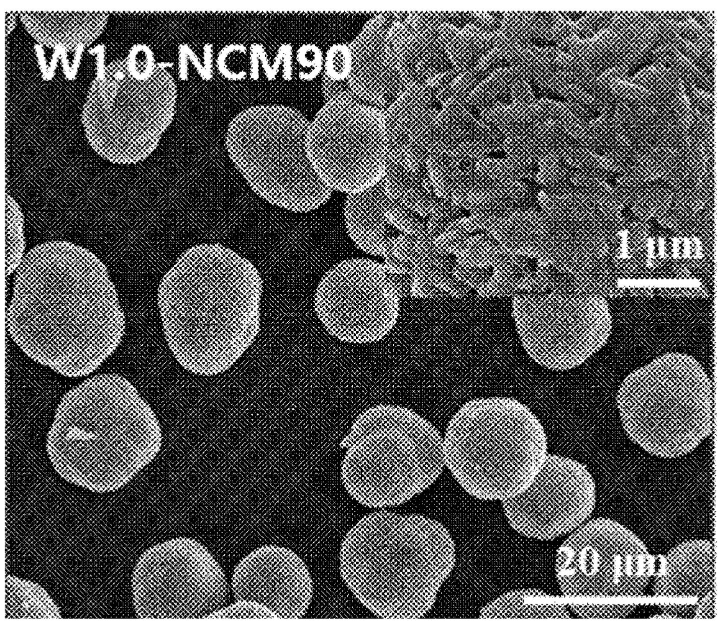
[FIG. 10B]
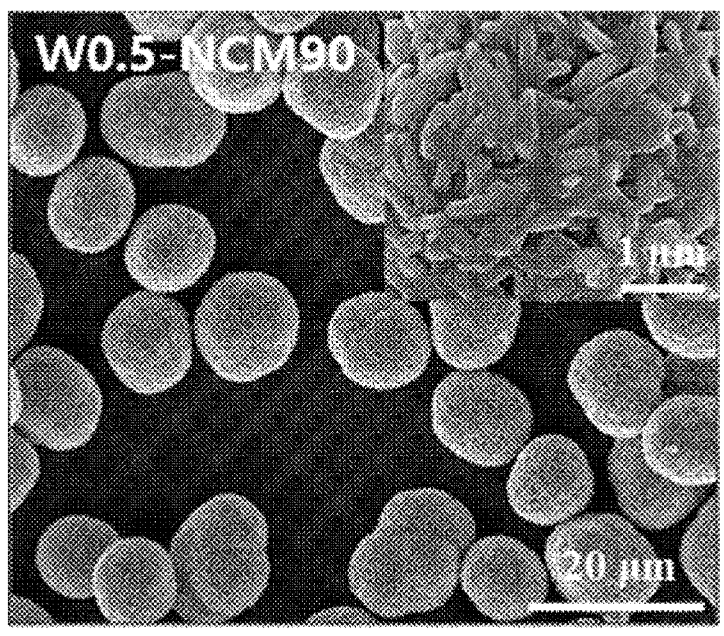

[FIG. 10C]
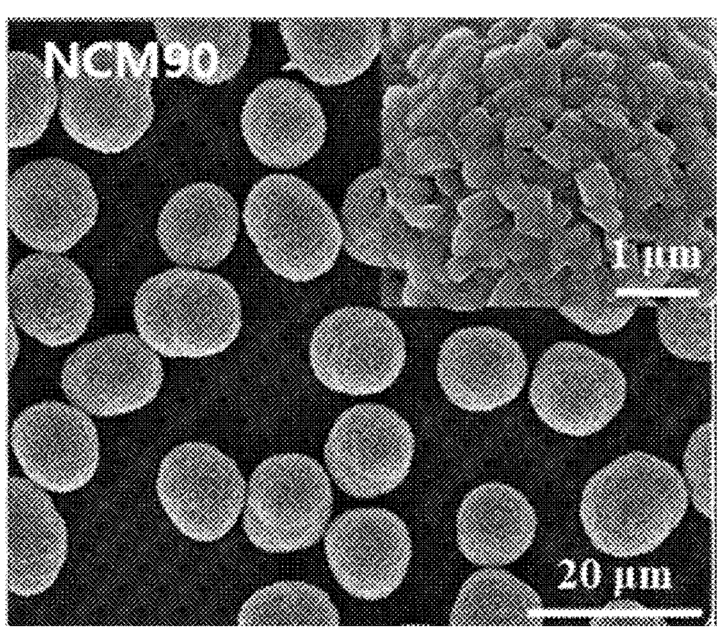
[FIG. 11]
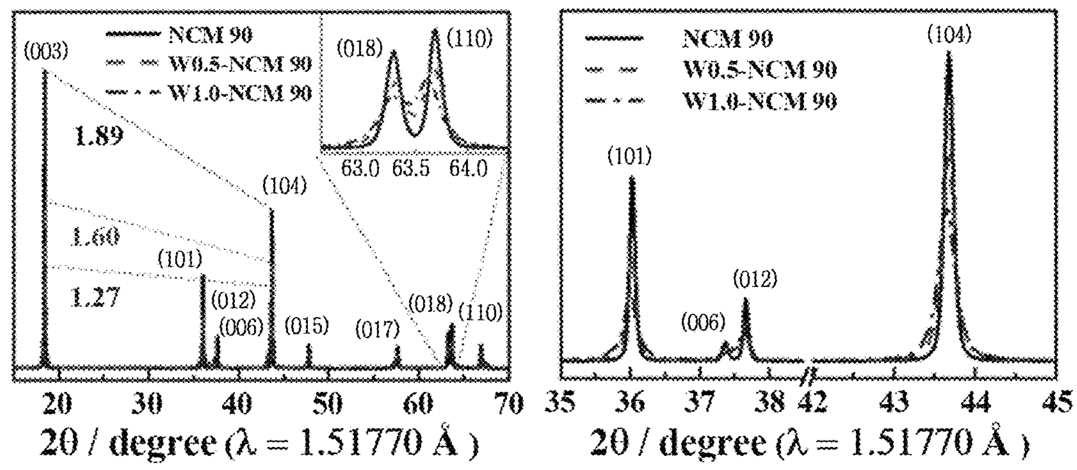

[FIG. 12]
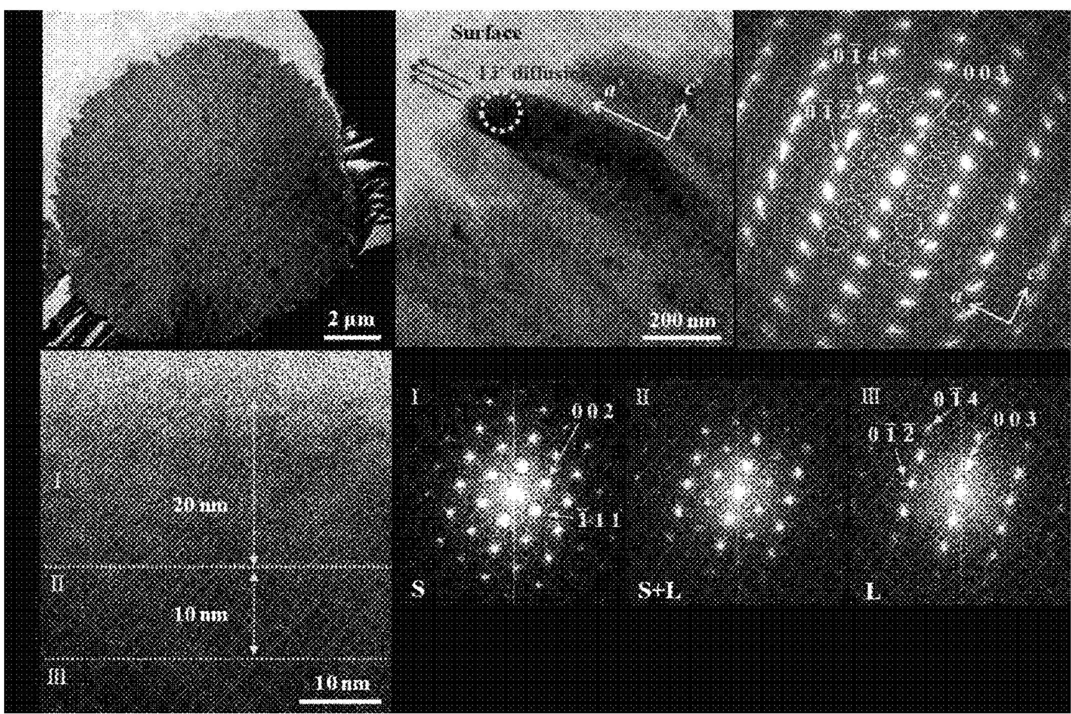
[FIG. 13]
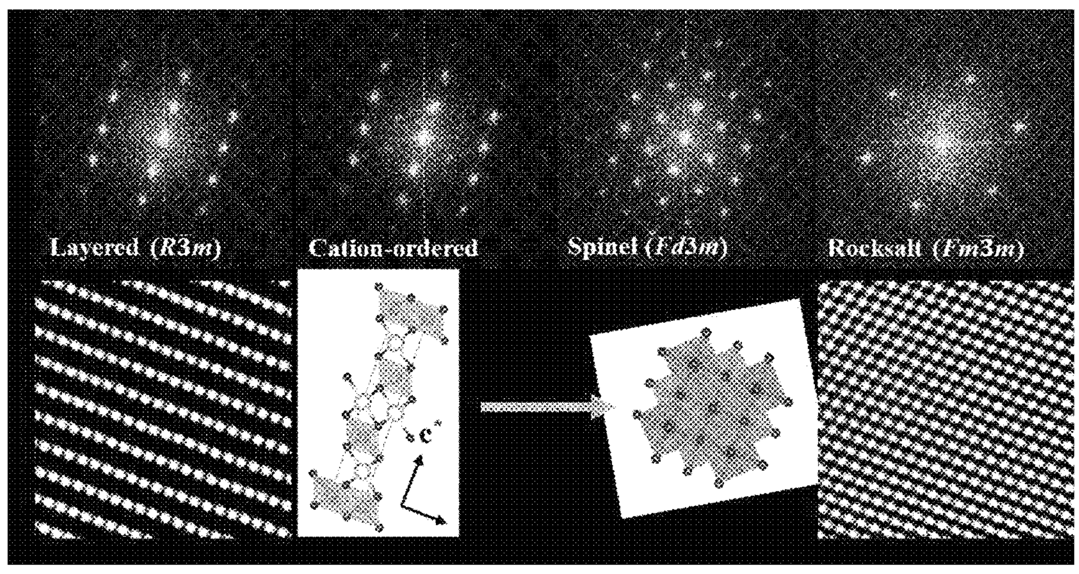

[FIG. 14]
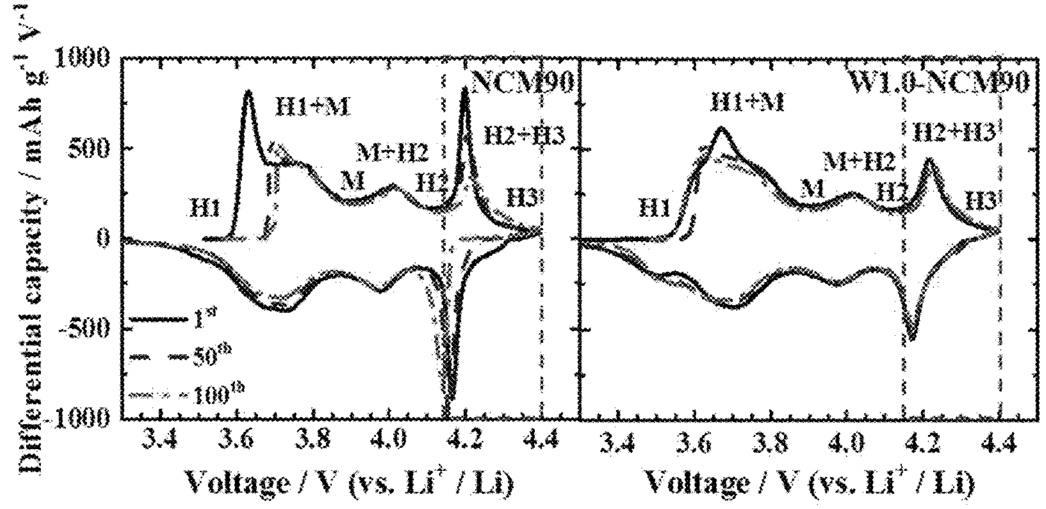
[FIG. 15]
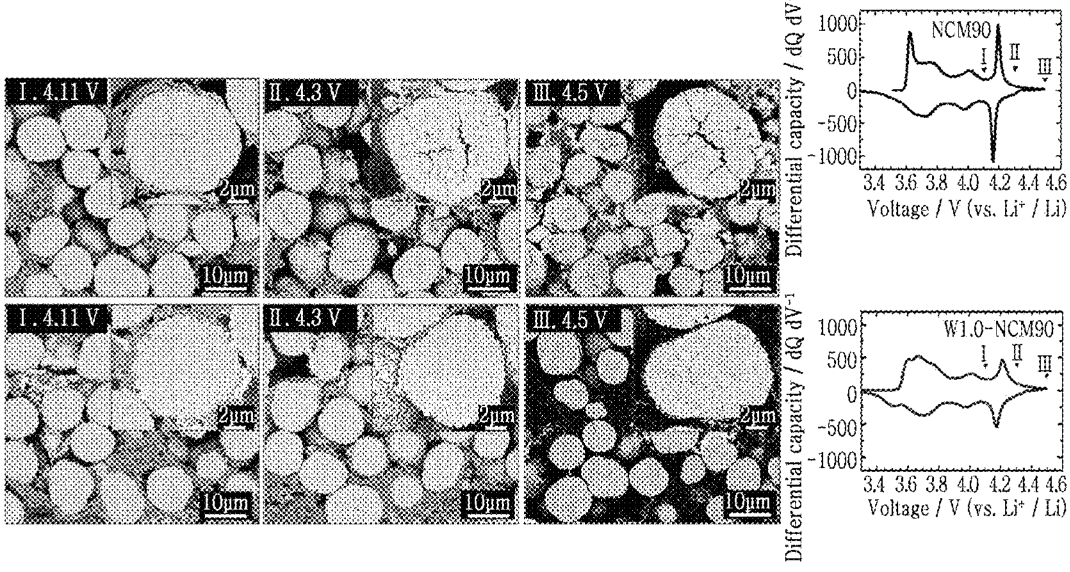

[FIG. 16]
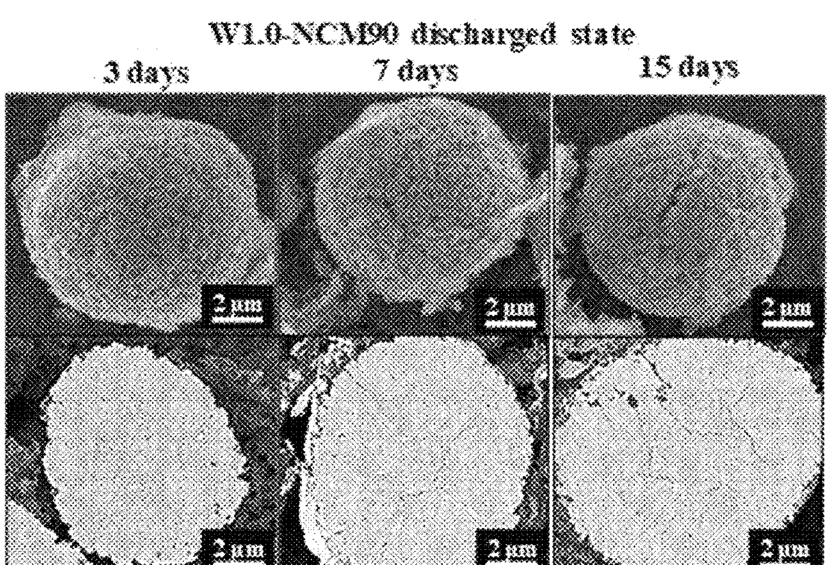
NCM90 discharged state
3 days
7 days
15 days
2 μm

[FIG. 17]
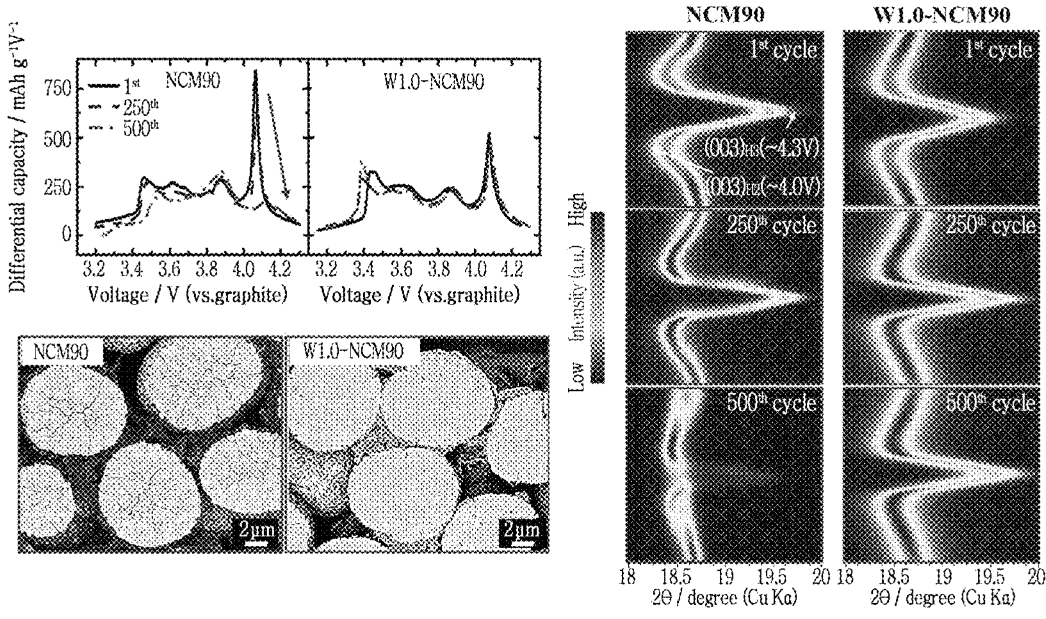

CATHODE ACTIVE MATERIAL AND LITHIUM SECONDARY BATTERY COMPRISING SAME

CROSS REFERENCE TO RELATED APPLICATIONS

This application is a National Stage of International Application No. PCT/KR2019/015383 filed Nov. 13, 2019, claiming priority based on Korean Patent Application No. 10-2018-0138587 filed Nov. 13, 2018 and Korean Patent Application No. 10-2019-0144342 filed Nov. 12, 2019.

TECHNICAL FIELD

The present disclosure relates to a positive active material and a lithium secondary battery including the same.

BACKGROUND ART

Secondary batteries capable of storing electrical energy have been increasingly demanded with the development of portable mobile electronic devices such as smart phones, MP3 players, and tablet personal computers. In particular, lithium secondary batteries have been increasingly demanded with the development of electric cars, medium and large energy storage systems, and portable devices requiring a high energy density.

Positive active materials used in the lithium secondary batteries have been studied due to the increase in demand for the lithium secondary batteries. For example, Korean Patent Laid-Open No. 10-2014-0119621 (Application No. 10-2013-0150315) discloses a secondary battery, in which the kind and a composition of metal substituted in a precursor are adjusted using the precursor for preparing a positive active material including the excessive amount of lithium and adjusting the kind and the amount of metal added to exhibit high-voltage capacity and long lifespan characteristics.

DISCLOSURE

Technical Problem

An object of the present disclosure is to provide a positive active material including a high nickel content and having a high capacity and improved cycle characteristics, and a lithium secondary battery including the same.

In addition, another object of the present disclosure is to provide a positive active material maintaining a stable structure thereof even at a high voltage and having improved thermal stability, and a lithium secondary battery including the same.

In addition, still another object of the present disclosure is to provide a positive active material having a layered structure including a novel shape on at least a part of a surface thereof, and a lithium secondary battery including the same.

The technical problems to be solved by the present disclosure are not limited to the foregoing.

Technical Solution

In order to solve the technical problems, the present disclosure provides a positive active material.

In one aspect, the present disclosure provides a positive active material for a lithium secondary battery, the positive active material including: a secondary particle including a group of a plurality of primary particles, in which the primary particles include first primary particles provided on a surface portion of the secondary particle and each having a spinel structure at an end thereof, and the primary particle is made of lithium (Li), nickel (Ni), cobalt (Co), manganese (Mn), and tungsten (W) which is a doping element.

According to the embodiment of the present disclosure, the primary particle may have a layered structure and include the spinel structure in a first region which is the end of the first primary particle.

According to the embodiment of the present disclosure, the first region may be formed at a depth of 5 nm to 50 nm inward from an outermost surface of the first primary particle.

According to the embodiment of the present disclosure, the secondary particle may be formed in a spherical shape, and the first region may account for 0.2% to 1.3% of an average radius of the secondary particle in a direction from the outermost surface to a center of the secondary particle.

According to the embodiment of the present disclosure, the first primary particle may have a transverse section having a flake shape having a major axis and a minor axis, and the first region may account for 0.5% to 4% of an average length of the major axis of the first primary particle.

According to the embodiment of the present disclosure, as a doping element content increases, the first region of the first primary particle may increase, a length of a lattice parameter a may increase, and a length of a lattice parameter c may decrease.

According to the embodiment of the present disclosure, in an X-ray diffraction pattern measured by a powder X-ray diffraction device (XRD) using a CuKα1 ray, a peak intensity ratio (003)/(104) of intensity of peak ascribed to (003) plane to intensity of peak ascribed to (104) plane may be 1.05 to 1.75, and the peak intensity ratio (003)/(104) may decrease as the amount of addition of the doping element increases.

According to the embodiment of the present disclosure, the secondary particle may be made based on a chemical formula $Li_x(Ni_yM_{1-y-z}W_z)O_2$ (in the chemical formula, M is Co and Mn, x is 0.9 to 1.2, y is 0.85 to 0.95, z is 0.005 to 0.02), and an exothermal peak of 190° C. to 220° C. may be obtained during a differential scanning calorimetry (DSC) analysis after charging is performed with a constant current at 4.4V cut-off.

According to the embodiment of the present disclosure, the spinel structure provided in the first region may be formed before initial charging is performed.

According to the embodiment of the present disclosure, based on a total amount of nickel (Ni), cobalt (Co), manganese (Mn), and tungsten (W) which is the doping element, nickel (Ni) may account for 85 mol % or more, and tungsten (W), which is the doping element, may account for 0.1 mol % to 2 mol %.

According to the embodiment of the present disclosure, nickel (Ni) may account for 90 mol % or more.

According to the embodiment of the present disclosure, a BET specific surface area of the secondary particle may be 0.15 $m^2/g$ to 0.6 $m^2/g$, and the BET specific surface area may increase as a doping element content increases.

In another aspect, the present disclosure provides a positive electrode for a secondary battery, including the above-mentioned positive active material for a lithium secondary battery.

In still another aspect, the present disclosure provides a lithium secondary battery including: the above-mentioned positive electrode; a negative electrode made of graphite or lithium metal; and an electrolyte.

According to the embodiment of the present disclosure, when the negative electrode is made of graphite, a capacity retention rate with respect to an initial capacity is 80% or more after charging/discharging is performed at 3.0 V to 4.3 V at room temperature and 500 cycles are performed.

In addition, the embodiment of the present disclosure provides a battery module including the above-mentioned lithium secondary battery as a unit cell.

Another embodiment of the present disclosure provides a battery pack including the above-mentioned battery module, in which the battery pack is used as a power source for medium and large devices, the medium and large devices are selected from a group consisting of an electric vehicle, a hybrid electric vehicle, a plug-in hybrid electric vehicle, and an electric power storage system.

Advantageous Effects

According to the present disclosure as described above, it is possible to provide the positive active material including the high nickel content, maintaining the high discharge capacity, having the improved thermal stability, and the lithium secondary battery including the same.

In addition, according to the present disclosure, it is possible to provide the positive active material for a lithium secondary battery having the layered structure and including the novel structure on the outer surface thereof, thereby maintaining the stable micro-structure without degrading lifespan characteristics even though the cycles are performed for a long period of time, and the lithium secondary battery including the same.

DESCRIPTION OF DRAWINGS

FIG. 1 is a view for explaining a positive active material according to an embodiment of the present disclosure.

FIG. 2 is a view illustrating a cross section of the positive active material according to the embodiment of the present disclosure taken along line A-B in FIG. 1.

FIG. 3 is a view for explaining a positive active material according to a modified example of the embodiment of the present disclosure.

FIG. 4 is a view for explaining primary particles included in the positive active material according to the embodiment of the present disclosure.

FIG. 5 is an enlarged view of a secondary particle and the primary particles constituting the secondary particle according to the embodiment of the present disclosure.

FIG. 6 is a transmission electron microscope (TEM) image of a crystal structure of a primary particle positioned on a surface of a positive active material according to Example 1 of the present disclosure.

FIG. 8 illustrates a TEM image of a positive active material prepared according to Comparative Example 1.

FIG. 9 is a view illustrating a result of observing enlarged regions a, b, and c in FIG. 8 with HR TEM.

FIGS. 10A to 10C illustrate SEM images according to Comparative Example 1 and Examples 1 and 2 of the present disclosure 1.

FIG. 11 illustrates an XRD graph according to Comparative Example 1 and Examples 1 and 2 of the present disclosure.

FIG. 12 illustrates an STEM image, a TEM image, an HR-TEM image, and an FT image according to Example 1 of the present disclosure.

FIG. 13 is a view illustrating respective using electron diffraction patterns.

FIG. 14 illustrates dQ/dV graphs illustrating charge/discharge characteristics at 4.4 V and illustrating changes in volumes according to cell voltages in respect to the positive active materials according to Comparative Example 1 and Examples 1 and 2 of the present disclosure.

FIG. 15 illustrates dQ/dV graphs and SEM images and illustrating cross sections after charging Comparative Example 1 and Example 1 of the present disclosure at 4.11 V, 4.3 V, and 4.5 V.

FIG. 16 illustrates SEM images illustrating results of checking Comparative Example 1 and Example 1 of the present disclosure and after performing high-temperature aging tests on Comparative Example 1 and Example 1 of the present disclosure at 60° C. for three days, seven days, and fifteen days and then completely discharging Comparative Example 1 and Example 1 of the present disclosure.

FIG. 17 illustrates dQ/dV graphs indicating results of checking pouch full-cells prepared using Comparative Example 1 and Example 1 of the present disclosure, SEM cross-sectional images after performing 500 cycles, and 2θ contour plots selected to correspond to (003) peaks (reflection).

DESCRIPTION OF MAIN REFERENCE NUMERALS OF DRAWINGS

Figure 7:
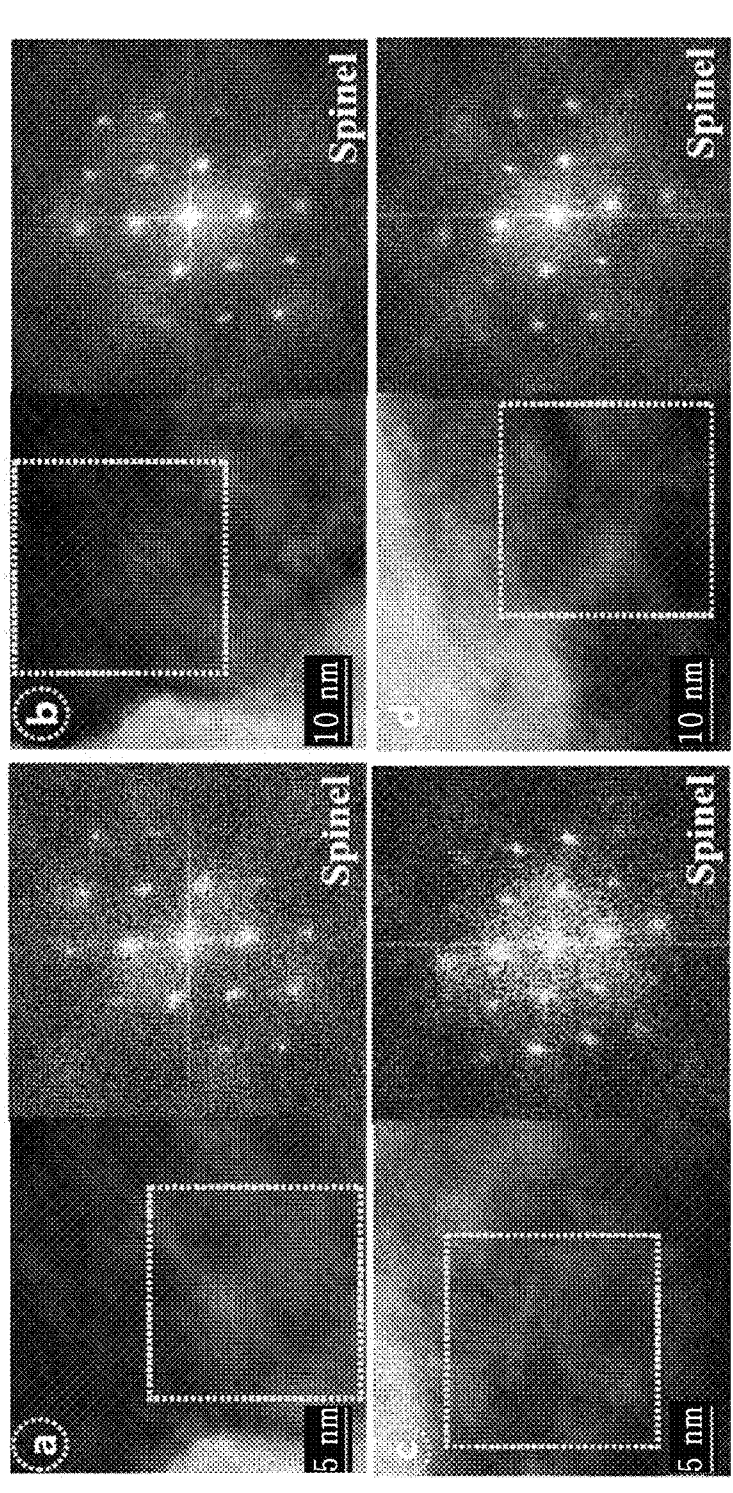
FIG. 7 is a view illustrating a result of observing enlarged regions a, b, c, and d in FIG. 6 with HR TEM.

100: Positive active material
110: Surface portion
120: Center portion

BEST MODE

Hereinafter, exemplary embodiments of the present disclosure will be described described in detail with reference to the accompanying drawings. However, the technical spirit of the present disclosure is not limited to the embodiments to be described below and may be specified as other aspects. On the contrary, the embodiments introduced herein are provided to make the disclosed content thorough and complete, and sufficiently transfer the spirit of the present disclosure to those skilled in the art.

In the present specification, when one constituent element is described as being disposed on another constituent element, one constituent element may be formed directly on another constituent element or a third constituent element may be interposed therebetween. In the drawings, a thickness of each film and a thickness of each region are exaggerated for effective descriptions of technical contents.

The terms "first", "second", and "third" are used to describe the various constituent elements in the various embodiments of the present specification, but the constituent elements should not be limited by the terms. These terms are merely used to distinguish one constituent elements from the other constituent elements. Therefore, a component, which is referred to as a first component in one embodiment, may be referred to as a second component in other embodiments. The embodiments described and illustrated herein also include complementary embodiments thereof. In the present specification, the term "and/or" is used as a meaning including at least one of the associated listed items.

In the specification, singular expressions include plural expressions unless clearly described as different meanings in the context. In addition, it should be understood the terms "comprises," "comprising," "includes," "including," "containing," "has," "having" or other variations thereof are inclusive and therefore specify the presence of stated features, integers, steps, components, or combinations thereof, but do not preclude the presence or addition of one or more other features, integers, steps, components, or combinations thereof.

In addition, in the description of the present disclosure herein, the specific descriptions of publicly known related functions or configurations will be omitted when it is determined that the specific descriptions may unnecessarily obscure the subject matter of the present disclosure.

Moreover, it will be understood that when a ratio of a first crystal structure is higher than that of a second crystal structure in a specific portion, the specific portion may include both the first crystal structure and the second crystal structure and the ratio of the first crystal structure may be higher than that of the second crystal structure, or the specific portion may have only the first crystal structure.

Furthermore, in the present specification, a crystal system may include seven crystal systems, i.e., a triclinic crystal system, a monoclinic crystal system, an orthorhombic crystal system, a tetragonal crystal system, a trigonal or rhombohedral crystal system, a hexagonal crystal system, and a cubic crystal system.

Furthermore, the term "mol %" means a metal content included in a positive active material or positive active material precursor on the assumption that a sum of the other metals in the positive active material or positive active material precursor except lithium and oxygen is 100%.

FIG. 1 is a view for explaining a positive active material according to an embodiment of the present disclosure, FIG. 2 is a view illustrating a cross section of the positive active material according to the embodiment of the present disclosure taken along line A-B in FIG. 1, and FIG. 3 is a view for explaining a positive active material according to a modified example of the embodiment of the present disclosure.

Referring to FIGS. 1 and 2, the positive active material according to the embodiment of the present disclosure may include a secondary particle 100 in which a plurality of primary particles is agglomerated. The secondary particle 100 may include a first crystal structure and a second crystal structure. The first crystal structure and the second crystal structure may be different crystal systems. Specifically, according to the embodiment, the first crystal structure may be a structure in which a spinel structure and a layered structure coexist. The second crystal structure may be a layered structure.

The secondary particle 100 may include a surface portion 110 and a center portion 120. The surface portion 110 may be a part of the secondary particle 100, in which a ratio of the first crystal structure is higher than a ratio of the second crystal structure. The center portion 120 may be a part of the secondary particle 100, in which a ratio of the second crystal structure is higher than a ratio of the first crystal structure.

According to the embodiment, as described above, the surface portion 110 may include both the first crystal structure and the second crystal structure, and the ratio of the first crystal structure may be higher than the ratio of the second crystal structure. Alternatively, according to another embodiment, the surface portion 110 may have only the first crystal structure.

According to the embodiment, as described above, the center portion 120 may include both the first crystal structure and the second crystal structure, and the ratio of the second crystal structure may be higher than the ratio of the first crystal structure. Alternatively, according to another embodiment, the center portion 120 may have only the second crystal structure.

The surface portion 110 may surround at least a part of the center portion 120.

According to the embodiment, as illustrated in FIG. 2, the surface portion 110 may be provided in a shape that surrounds the entire center portion 120.

Alternatively, according to another embodiment, as illustrated in FIG. 3, the surface portion 110 may surround a part of the center portion 120, and the center portion 120 may define a part of a surface of the positive active material 100.

According to the embodiment, the surface of the secondary particle 100 and a part of the secondary particle 100 adjacent to the surface of the secondary particle 100 may be mainly or completely provided such that the spinel structure and the layered structure coexist. A center of the secondary particle 100 and a part of the secondary particle 100 adjacent to the center of the secondary particle 100 may mainly or completely have the layered structure. In other words, the spinel structure and the layered structure may coexist on the surface portion 110 of the secondary particle 100 and the part of the secondary particle 100 adjacent to the surface portion 110, and only the layered structure may be observed on the center of the secondary particle 100 and the part of the secondary particle 100 adjacent to the center of the secondary particle 100.

According to the embodiment, a ratio of the center portion 120 may be higher than a ratio of the surface portion 110 in the secondary particle 100. For example, a ratio of the second crystal structure may be higher than a ratio of the first crystal structure in the secondary particle 100.

In the secondary particle 100, a portion (or the surface portion 110) having the first crystal structure and a portion (or the center portion 120) having the second crystal structure may be made of the same element. For example, in the secondary particle 100, the portion (or the surface portion 110) having the first crystal structure and the portion (or the center portion 120) having the second crystal structure may be made of an oxide including lithium, nickel, cobalt, manganese, and tungsten.

According to the embodiment, the secondary particle 100 may include lithium, a doping element, and at least any one of nickel, cobalt, manganese, and aluminum. For example, the doping element may include tungsten (W).

For example, the secondary particle 100 may be made of a metal oxide including nickel, cobalt, manganese, lithium, the doping element, and oxygen. The technical feature according to the embodiment of the present disclosure may be applied to positive active materials including various substances.

According to the embodiment, a concentration of the doping element may be substantially constant in the secondary particle 100. Alternatively, according to another embodiment, the doping elements may have different concentrations or have a concentration gradient in the secondary particle 100.

According to the embodiment, the positive active material may be represented by the following Chemical Formula 1.

[Chemical Formula 1]

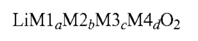

$$LiM1_aM2_bM3_cM4_dO_2$$

In Chemical Formula 1, each of 'M1', 'M2', and 'M3' is one of nickel, cobalt, manganese, and aluminum, $0 \le a < 1$, $0 \leq b < 1$, $0 \leq c < 1$, $0 < d < 0.02$, at least one of 'a', 'b' or 'c' is greater than 0, and 'M1', 'M2', 'M3', and 'M4' are different metals.

In Chemical Formula 1, M4 may be the doping element.

According to the embodiment, in the secondary particle 100, concentrations other metal materials other than the doping element may be substantially constant in the secondary particle 100. Alternatively, according to another embodiment, in the secondary particle 100, the other metal materials other than the doping element may have concentration gradients in the entire particle or have concentration gradients in a part of the particle, in a direction from the center toward the surface. Alternatively, according to still another embodiment, the secondary particle 100 may include a core portion and a shell portion having a different metal concentration from the core portion. The technical feature according to the embodiment of the present disclosure may be applied to positive active materials having various structures and shapes.

FIG. 4 is a view for explaining the secondary particle included in the positive active material according to the embodiment of the present disclosure and the primary particles constituting the secondary particle.

Referring to FIG. 4, according to the embodiment, the positive active material may include primary particles 30 and the secondary particle in which the primary particles 30 are agglomerated.

The primary particles 30 may extend in directions radiating from one region in the secondary particle toward a surface 20 of the secondary particle. The one region in the secondary particle may be a center portion 10 of the secondary particle. In other words, the primary particle 30 may be provided in a flake shape. A cross section of the primary particle 30 has a rod shape extending from one region in the secondary particle toward the surface 20 of the secondary particle.

A movement path for metal ions (e.g., lithium ions) and an electrolyte may be provided between the primary particles 30 each having a rod shape, i.e., between the primary particles 30 extending in directions D from the center 10 toward the surface 20 of the secondary particle. Therefore, the positive active material according to the embodiment of the present disclosure may improve charge/discharge efficiency of a secondary battery.

According to the embodiment, the primary particle 30 relatively adjacent to the surface 20 of the secondary particle may have a longer length in the direction from the center 10 toward the surface 20 of the secondary particle than the primary particle 30 relatively adjacent to the center 10 of the secondary particle. In other words, in at least a part of the secondary particle which extends from the center 10 to the surface 20 of the secondary particle, the lengths of the primary particles 30 may sequentially increase as a distance from the surface 20 of the secondary particle decreases.

The plurality of primary particles 30 may include first type particles having only the first crystal structure, second type particles having only the second crystal structure, and third type particles including both first portions 30*a* having the first crystal structure and second portions 30*b* having the second crystal structure.

According to the embodiment, in the case in which the primary particles have both the first portions 30*a* and the second portions 30*b* as described above, a ratio of the first portions 30*a* may be lower than a ratio of the second portions 30*b* in the primary particles.

In addition, the first portion 30*a* and the second portion 30*b* may be represented by the same chemical formula, or the first portion 30*a* and the second portion 30*b* may include the same element.

In addition, according to the embodiment, the third type particles are provided on the surface 20 of the secondary particle, the first portions 30*a* of the third type particles may be positioned on the surface 20 of the secondary particle such that the first portions 30*a* define the surface portion 110 of the secondary particle 20, and the second portions 30*b* of the third type particles may be positioned in the secondary particle 20.

FIG. 5 is an enlarged view of the secondary particle and the primary particles constituting the secondary particle according to the embodiment of the present disclosure. Referring to FIG. 5, the embodiment of the present disclosure relates to the positive active material including the secondary particle including a group of the plurality of primary particles. The embodiment of the present disclosure includes the positive active material for a lithium secondary battery, in which the primary particles are provided on the surface portion of the secondary particle and include first primary particles each having a spinel structure at an end thereof, and the primary particle is made of lithium (Ni), nickel (Ni), cobalt (Co), manganese (Mn), and tungsten (W) which is a doping element.

The secondary particle may include a group of the plurality of primary particles, and the primary particles, which are provided on the surface of the secondary particle among the primary particles, may include the first primary particles each having the spinel structure at the end thereof. For example, the primary particle may have a layered structure, and the spinel structure may be provided in a first region which is the end of the first primary particle. In addition, the spinel structure provided in the first region may be formed before initial charging is performed.

The secondary particle may be made based on $Li_x(Ni_yM_{-y-z}W_z)O_2$ which is Chemical Formula 2. In Chemical Formula 2, M may be Co and Mn, x may be 0.9 to 1.2, y may be 0.85 to 0.95, and z may be 0.005 to 0.02. For example, M may mean Mn and Co, and when $M_{1-y-z}$ is $Mn_{a1}$ and $Co_{a2}$, $(1-y-z)$ may have the same value as $(a1+a2)$.

An exothermal peak of 190° C. to 220° C. may be obtained when performing a differential scanning calorimetry (DSC) analysis after charging a positive electrode using the secondary particle with a constant current at 4.4V cut-off. Particularly, the exothermal peak may be 195° C. to 220° C., and more particularly, 195° C. to 200° C.

Typically, because nickel-based composite compound has only the layered structure, a spinel structure, which was not present in a structure for performing charging and discharging, is created, and there occurs non-uniformity between the previously existing layered structure and the spinel structure irregularly created during a process of performing the cycle. Due to the non-uniformity, stability of a micro-structure of the secondary particle constituting the positive active material deteriorates, which causes a problem in that cycle characteristics, stability, and the like deteriorate.

On the contrary, the positive active material according to the present embodiment has the structure represented by the above-mentioned Chemical Formula 2, includes a predetermined amount of tungsten (W) which is the doping element, and uses a novel manufacturing method, thereby improving stability of the secondary particle. In addition, the positive active material according to the present embodiment may have the spinel structure on the surface of the positive active material before initial charging/discharging is performed.

For example, the positive active material may include the secondary particle having an approximately spherical shape and formed by agglomerating the group of the plurality of primary particles, and the primary particles may include the first primary particles positioned on the surface portion of the secondary particle and each having the spinel structure at the end thereof.

As another method, the first primary particles may account for 80% or more, and particularly, 90% or more of the primary particles provided on the surface of the secondary particle, and more particularly, all the primary particles provided on the surface of the secondary particle may be the first primary particles.

The first primary particles may be provided on the surface of the secondary particle and aligned such that the first region having the spinel structure is provided on the surface of the secondary particle. The first region may be formed at a depth of 5 nm to 50 nm inward from an outermost surface of the first primary particle. The first region may be formed at an approximately vertical depth of 5 nm to 50 nm inward from the outermost surface of the first primary particle.

If the depth of the first region is less than 5 nm, a thickness of the surface of the secondary particle, which is defined by the portion in which the spinel structure and the layered structure are mixed, is too small, and as a result, a micro-crack may be formed due to permeation of the electrolyte during the process of performing the cycle of the secondary battery, and cycle and thermal stability characteristics may deteriorate due to the micro-crack. In contrast, if the depth of the first region is more than 50 nm, the portion in which the layered structure and the spinel structure are mixed is too thick, which may interrupt movements of lithium ions and electric charges and cause a decrease in discharge capacity. Particularly, the first region may be formed at an approximately vertical depth of 10 nm to 50 nm, and more particularly, 20 nm to 30 nm inward from the outermost surface of the first primary particle.

The secondary particle may be formed in a spherical shape, and the first region may account for 0.2% to 1.3% of an average radius of the secondary particle in a direction from the outermost surface to the center of the secondary particle. If the first region accounts for less than 0.2% in the direction from the outermost surface to the center of the secondary particle, the cycle characteristics of the secondary battery deteriorate. If the first region accounts for more than 1.3%, efficiency in moving lithium ions deteriorates, which may cause a deterioration in initial charge/discharge efficiency. Particularly, a second region may account for 0.2% to 0.9%, and more particularly, 0.4% to 0.7% in the direction from the outermost surface to the center of the primary particle.

As another method, the first primary particle may have a transverse section having a flake shape having a major axis and a minor axis, and the first region accounts for 0.5% to 4% of an average length of the major axis of the first primary particle. If the first region accounts for less than 0.5% of the average length of the major axis of the first primary particle, it is difficult for the first region to have a uniform thickness on the entire first primary particle, cycle performance deteriorates. If the first region accounts for more than 4%, the thickness of the first region increases, which may cause a deterioration capacity. Particularly, the first region may account for 1% to 4%, and more particularly, 1% to 3% of the average length of the major axis of the first primary particle.

As a doping element content increases, the first region of the first primary particle may increase, a length of a lattice parameter a of the first primary particle may increase, and a length of a lattice parameter c of the first primary particle may decrease. The positive active material according to the present embodiment may be layered structure compound. There may be a tendency that as a tungsten (W) content, which is the doping element content, of the first primary particle increases, the first region, in which the spinel structure and the layered structure are mixed, increases. In addition, the first primary particle may be controlled by the doping element so that the flake shape becomes sleeker. Specifically, the lattice parameter a of the first primary particle is parallel to the direction toward the center of the secondary particle. The first primary particle may be formed in such a manner that the lattice parameter a increases, but the lattice parameter c decreases. Since the lattice parameter a of the first primary particle increases, the lithium ions may more easily move to the center of the secondary particle, and thus charge/discharge efficiency may be improved.

In addition, a BET specific surface area of the secondary particle is 0.15 $m^2/g$ to 0.6 $m^2/g$, and the BET specific surface area may increase as the doping element content increases. In the positive active material according to the present embodiment, the BET specific surface area of the secondary particle constituting the positive active material is 0.15 $m^2/g$ to 0.6 $m^2/g$, and the BET specific surface area may increase within the above-mentioned range as the doping element content increases. If the BET specific surface area is less than 0.15 $m^2/g$, a contact area of the electrolyte decreases, which may cause a deterioration in efficiency in moving lithium ions during the charging/discharging. If the BET specific surface area is more than 0.6 $m^2/g$, the contact area increases, which may be advantageous for a flash secondary battery, but strain occurs due to a relationship between the permeation of the electrolyte and the surface during the process of performing the cycle of the secondary battery, and as a result, the micro-structure may be deformed or the formation of the micro-crack connecting the surface portion and the center portion of the secondary particle may be increased. Particularly, the BET specific surface area may be 0.35 $m^2/g$ to 0.6 $m^2/g$, and more particularly, 0.35 $m^2/g$ to 0.45 $m^2/g$.

The spinel structure provided in the first region may be formed before the initial charging is performed. The generally-known spinel structure is a structure which is not found before the layered structure compound is charged. In contrast, in the secondary battery according to the present embodiment, the spinel structure may be formed and provided in advance before the initial charging is performed.

Based on a total amount of nickel (Ni), cobalt (Co), manganese (Mn), and tungsten (W) which is the doping element, Nickel (Ni) may account for 85 mol % or more, and tungsten (W), which is the doping element, may account for 0.1 mol % to 2 mol %. If the tungsten (W) content is less than 0.1 mol %, the first region implemented by the addition of tungsten (W) is not sufficiently formed, and the improvement on lifespan characteristics is insignificant. If the tungsten (W) content is more than 2 mol %, there may be a problem in that the initial capacity or the like deteriorates. Particularly, nickel (Ni) may account for 90 mol % or more, and more particularly, nickel (Ni) may account for 90 mol % to 95 mol %. In addition, particularly, tungsten (W), which is the doping element, may account for 0.5 mol % to 2 mol %, and more particularly, tungsten (W) may account for 0.5 mol % to 1 mol %.

According to the embodiment of the present disclosure, the positive active material may be a positive active material used for a lithium secondary battery having a layered structure, and nickel may account for 90 mol % or more. Particularly, nickel (Ni), cobalt (Co), and manganese (Mn) are provided at a molar ratio of 8.5:0.75:0.75, and the doping element may be further included therein. More particularly, nickel (Ni), cobalt (Co), and manganese (Mn) may be provided at a molar ratio of 9:0.5:0.5, and the doping element may be further included therein.

Hereinafter, comparative examples and examples of the present disclosure will be described. However, the following examples are merely the exemplary embodiments of the present disclosure, and the scope of the present disclosure is not limited by the following examples.

1. Preparation of Positive Active Material

Example 1 (W1-NCM90)

10 liters of distilled water was put into a co-precipitation reactor (capacity of 40 L), $N_2$ gas was supplied into the reactor at a rate of 6 liter/min, and the distilled water was stirred at 350 rpm while maintaining a temperature of the reactor at 40° C. A nickel sulfate aqueous solution ($NiSO_4 \cdot 6H_2O$, Samchun Chemicals), a cobalt sulfate aqueous solution ($CoSO_4 \cdot 7H_2O$, Samchun Chemicals), and a manganese sulfate aqueous solution ($MnSO_4 \cdot H_2O$, Samchun Chemicals) were mixed by the amount such that nickel (Ni), cobalt (Co), and manganese (Mn) were provided at a molar ratio of 90:5:5, and thus a metal solution with a concentration of 2 M was prepared. Powdered $WO_3$ was added to and dissolved in 4.0 mol/L of NaOH (aq.) so that NaOH (aq.) had 0.02 M, and thus a doping element solution (NaOH accounts for 2 mol based on a total number of moles of Ni, Co, and Mn) was prepared.

The prepared metal solution with a concentration of 2 M, an ammonia solution ($NH_4OH$, JUNSEI) with a concentration of 16 M, and the doping element solution were continuously inputted into the reactor at rates of 0.561 liter/hour, 0.08 liter/hour, and 0.60 liter/hour, respectively. A pH in the reactor was checked during a co-precipitation reaction, and the pH in the reactor was adjusted by adding a NaOH (aq.) solution so that the pH in the reactor was maintained to be 11.4.

The co-precipitation reaction was performed in the reactor, a nano-particle hydroxide was initially formed during the reaction, and then nickel-cobalt-manganese-tungsten hydroxides were slowly accumulated on a surface of the nano particle hydroxide, such that a precursor with a micro-size was formed. Next, the prepared precursor was washed several times using distilled water, the precursor was filtered by a filter and then dried in a dry oven at 110° C. for 12 hours, such that a $[Ni_{0.89}Co_{0.05}Mn_{0.05}W_{0.01}](OH)_2$ metal composite hydroxide was prepared.

The prepared $[Ni_{0.89}Co_{0.05}Mn_{0.05}W_{0.01}](OH)_2$ metal composite hydroxide and $LiOH \cdot H_2O$ were uniformly mixed so that a molar ratio of Li:(Ni+Co+Mn+W) was 1.01:1 and then fired at 770° C. for 10 hours, such that $Li[Ni_{0.89}Co_{0.05}Mn_{0.05}W_{0.01}]O_2$ (hereinafter, referred to as W1-NCM90) positive active material powder was obtained.

Example 2 (W0.5-NCM90)

A metal composite hydroxide of $[Ni_{0.895}Co_{0.05}Mn_{0.05}W_{0.005}](OH)_2$ was prepared in the same manner as that in Example 1 except that the doping element solution, which was prepared by adding and dissolving the powdered $WO_3$ into 4.0 mol/L of NaOH (aq.) so that NaOH (aq.) had 0.01 M, was used.

The prepared $[Ni_{0.895}Co_{0.05}Mn_{0.05}W_{0.005}](OH)_2$ metal composite hydroxide and $LiOH \cdot H_2O$ were uniformly mixed so that a molar ratio of Li:(Ni+Co+Mn+W) was 1.01:1 and then fired at 770° C. for 10 hours, such that $Li[Ni_{0.895}Co_{0.05}Mn_{0.05}W_{0.005}]O_2$ (hereinafter, referred to as W0.5-NCM90) positive active material powder was obtained.

Example 3 (W1-NCM85)

A $[Ni_{0.84}Co_{0.075}Mn_{0.075}W_{0.01}](OH)_2$ metal composite hydroxide was prepared in the same manner as that in Example 1 except that the metal sulfide aqueous solution, which was prepared by mixing the nickel sulfate aqueous solution ($NiSO_4 \cdot 6H_2O$, Samchun Chemicals), the cobalt sulfate aqueous solution ($CoSO_4 \cdot 7H_2O$, Samchun Chemicals), and the manganese sulfate aqueous solution ($MnSO_4 \cdot H_2O$, Samchun Chemicals) at the molar ratio of Ni:Co:Mn=85:7.5:7.5, was used.

The prepared $[Ni_{0.84}Co_{0.075}Mn_{0.075}W_{0.01}](OH)_2$ metal composite hydroxide and $LiOH \cdot H_2O$ were uniformly mixed so that a molar ratio of Li:(Ni+Co+Mn+W) was 1.01:1 and then fired at 790° C. for 10 hours, such that $Li[Ni_{0.84}Co_{0.75}Mn_{0.75}W_{0.01}]O_2$ (hereinafter, referred to as W1-NCM85) positive active material powder was obtained.

Example 4 (W0.5-NCM85)

A $[Ni_{0.84}Co_{0.075}Mn_{0.075}W_{0.005}](OH)_2$ metal composite hydroxide was prepared in the same manner as that in Example 1 except that the metal sulfide aqueous solution, which was prepared by mixing the nickel sulfate aqueous solution ($NiSO_4 \cdot 6H_2O$, Samchun Chemicals), the cobalt sulfate aqueous solution ($CoSO_4 \cdot 7H_2O$, Samchun Chemicals), and the manganese sulfate aqueous solution ($MnSO_4 \cdot H_2O$, Samchun Chemicals) at the molar ratio of Ni:Co:Mn=85:7.5:7.5, was used and the doping element solution, which was prepared by adding and dissolving the powdered $WO_3$ into 4.0 mol/L of NaOH (aq.) so that NaOH (aq.) had 0.01 M, was used.

The prepared $[Ni_{0.84}Co_{0.075}Mn_{0.075}W_{0.005}](OH)_2$ metal composite hydroxide and $LiOH \cdot H_2O$ were uniformly mixed so that a molar ratio of Li:(Ni+Co+Mn+W) was 1.01:1 and then fired at 790° C. for 10 hours, such that $Li[Ni_{0.84}Co_{0.075}Mn_{0.075}W_{0.005}]O_2$ (hereinafter, referred to as W0.5-NCM85) positive active material powder was obtained.

Example 5 (W1-NCM95)

A $[Ni_{0.94}Co_{0.025}Mn_{0.025}W_{0.01}](OH)_2$ metal composite hydroxide was prepared in the same manner as that in Example 1 except that the metal sulfide aqueous solution, which was prepared by mixing the nickel sulfate aqueous solution ($NiSO_4 \cdot 6H_2O$, Samchun Chemicals), the cobalt sulfate aqueous solution ($CoSO_4 \cdot 7H_2O$, Samchun Chemicals), and the manganese sulfate aqueous solution ($MnSO_4 \cdot H_2O$, Samchun Chemicals) at the molar ratio of Ni:Co:Mn=95:2.5:2.5, was used.

The prepared $[Ni_{0.94}Co_{0.025}Mn_{0.025}W_{0.01}](OH)_2$ metal composite hydroxide and $LiOH \cdot H_2O$ were uniformly mixed so that a molar ratio of Li:(Ni+Co+Mn+W) was 1.01:1 and then fired at 730° C. for 10 hours, such that $Li[Ni_{0.94}Co_{0.025}Mn_{0.025}W_{0.01}]O_2$ (hereinafter, referred to as W1-NCM95) positive active material powder was obtained.

Example 6 (W0.5-NCM95)

A $[Ni_{0.94}Co_{0.025}Mn_{0.025}W_{0.005}](OH)_2$ metal composite hydroxide was prepared in the same manner as that in Example 1 except that the metal sulfide aqueous solution, which was prepared by mixing the nickel sulfate aqueous solution ($NiSO_4{\cdot}6H_2O$, Samchun Chemicals), the cobalt sulfate aqueous solution ($CoSO_4{\cdot}7H_2O$, Samchun Chemicals), and the manganese sulfate aqueous solution ($MnSO_4{\cdot}H_2O$, Samchun Chemicals) at the molar ratio of Ni:Co:Mn=95:2.5:2.5, was used and the doping element solution, which was prepared by adding and dissolving the powdered $WO_3$ into 4.0 mol/L of NaOH (aq.) so that NaOH (aq.) had 0.01 M, was used.

The prepared $[Ni_{0.94}Co_{0.025}Mn_{0.025}W_{0.005}](OH)_2$ metal composite hydroxide and $LiOH{\cdot}H_2O$ were uniformly mixed so that a molar ratio of Li:(Ni+Co+Mn+W) was 1.01:1 and then fired at 730° C. for 10 hours, such that $Li[Ni_{0.94}Co_{0.025}Mn_{0.025}W_{0.005}]O_2$ (hereinafter, referred to as W0.5-NCM95) positive active material powder was obtained.

Comparative Example 1 (NCM90)

A $[Ni_{0.90}Co_{0.05}Mn_{0.05}](OH)_2$ metal composite hydroxide was prepared in the same manner as that in Example 1 except that the doping element solution was added.

The prepared $[Ni_{0.90}Co_{0.05}Mn_{0.05}](OH)_2$ metal composite hydroxide and $LiOH{\cdot}H_2O$ were uniformly mixed so that a molar ratio of Li:(Ni+Co+Mn) was 1.01:1 and then fired at 750° C. for 10 hours, such that a $Li[Ni_{0.90}Co_{0.05}Mn_{0.05}]O_2$ (hereinafter, referred to as NCM90) positive active material powder was obtained.

Comparative Example 2 (NCM85)

A $[Ni_{0.85}Co_{0.075}Mn_{0.075}](OH)_2$ metal composite hydroxide was prepared in the same manner as that in Example 1 except that the metal sulfide aqueous solution, which was prepared by mixing the nickel sulfate aqueous solution ($NiSO_4{\cdot}6H_2O$, Samchun Chemicals), the cobalt sulfate aqueous solution ($CoSO_4{\cdot}7H_2O$, Samchun Chemicals), and the manganese sulfate aqueous solution ($MnSO_4{\cdot}H_2O$, Samchun Chemicals) at the molar ratio of Ni:Co:Mn=85:7.5:7.5, was used and the doping element solution was added.

The prepared $[Ni_{0.85}Co_{0.075}Mn_{0.075}](OH)_2$ metal composite hydroxide and $LiOH{\cdot}H_2O$ were uniformly mixed so that a molar ratio of Li:(Ni+Co+Mn) was 1.01:1 and then fired at 770° C. for 10 hours, such that a $Li[Ni_{0.85}Co_{0.075}Mn_{0.075}]O_2$ (hereinafter, referred to as NCM85) positive active material powder was obtained.

Comparative Example 3 (NCM95)

A $[Ni_{0.95}Co_{0.025}Mn_{0.025}](OH)_2$ metal composite hydroxide was prepared in the same manner as that in Example 1 except that the metal sulfide aqueous solution, which was prepared by mixing the nickel sulfate aqueous solution ($NiSO_4{\cdot}6H_2O$, Samchun Chemicals), the cobalt sulfate aqueous solution ($CoSO_4{\cdot}7H_2O$, Samchun Chemicals), and the manganese sulfate aqueous solution ($MnSO_4{\cdot}H_2O$, Samchun Chemicals) at the molar ratio of Ni:Co:Mn=35:2.5:2.5, was used and the doping element solution was added.

The prepared $[Ni_{0.95}Co_{0.025}Mn_{0.025}](OH)_2$ metal composite hydroxide and $LiOH{\cdot}H_2O$ were uniformly mixed so that a molar ratio of Li:(Ni+Co+Mn) was 1.01:1 and then fired at 700° C. for 10 hours, such that a $Li[Ni_{0.95}Co_{0.025}Mn_{0.025}]O_2$ (hereinafter, referred to as NCM95) positive active material powder was obtained.

2. Evaluation of Characteristics of Particles of Positive Active Material (1) Chemical Composition The nickel (Ni) content, the cobalt (Co) content, the manganese (Mn) content, and the tungsten (W) content, which is the doping element content, of the examples and the comparative examples prepared as described above were checked using ICP-OES (OPTIMA 8300, Perkin Elmer).

(2) Shapes of Particles

The shapes of the powdered particles of the prepared positive active materials of Examples 1 and 2 and Comparative Example 1 were checked using SEM (Nova Nano SEM 450, FEI).

(3) Crystal Structure

XRD patterns of the prepared positive active materials of Examples 1 and 2 and Comparative Example 1 were checked using a particle acceleration XRD (synchrotron XRD) with 9B HRPD (high-resolution powder diffraction, $\lambda$=1.51770 Å) in Pohang Accelerator Laboratory (PAL, Pohang, Korea). Particle acceleration XRD data were measured at room temperature at an interval of 0.02° in 2θ within a range of 10 to 130°. A wavelength ($\lambda$=0.65303 Å) of an incident beam and a distance between a sample and a detector were adjusted using the $CeO_2$ standard. A modified 2032 coin-type half-cell having a Kapton window having a hole having a diameter of 3 mm and formed in a center portion of the half-cell was placed on an X-ray beam route. The XRD data were continuously measured by a 2-dimensional charging-coupling divide detector (Rayonix MX225-HS) in a transmission mode at an interval of 3.5 minutes while charging the half-cell with constant current density of 40 mA/g. For simple comparison, a 2θ angle for an in-situ XRD pattern was switched to a 2θ angle of a general purpose X-ray tube of 2=1.5406 Å (Cu $K_\alpha$).

The in-situ XRD data using the full-cell were measured using a transmission mode (Empyrean, PANalytical). In order to use the transmission mode, the analysis was performed without disassembling or dismantling the pouch full-cell prepared according to Examples 1 and 2 and Comparative Example 1. The pouch full-cell was charged with constant current density 10 mA/g (0.05 C). The XRD pattern was continuously detected every 40 minutes with a detector (PIXcel 1D, PANalytical). The XRD data were measured at 2θ within a range of 16 to 70° at an interval (step width) of 0.0263° (a wavelength ($\lambda$=1.5406 Å (Cu $K_\alpha$) of an incident beam).

(4) Micro-Structure

The micro-structures of the positive active materials prepared according to Examples 1 and 2 and Comparative Example 1 were checked with TEM (JEOL 2100F, JEOL). The TEM sample was prepared by a focused ion beam method (FIB, SCIOS, FEI). In order to measure a transverse section of the positive active material particle with SEM, positive electrodes charged with different states of charge were immediately washed using dimethyl carbonate and dried in a vacuum state in a glove box under an argon condition. The electrode was cut using an ion beam cross-sectional polisher (CP, JEOL SM-09010).

3. Preparation and Evaluation of Positive Electrode, Half-Cell, and Full-Cell (1) Preparation of Positive Electrode, Half-Cell, and Full-Cell Positive electrode slurry was prepared by uniformly mixing the powdered positive active materials according to Example 1, Example 2, and Comparative Example 1 (poly (vinylidene fluoride)) and carbon black with 0.6 g of (N-methyl pyrrolidone) at a weight ratio of 90:4.5:5.5, respectively. The prepared positive electrode slurry was coated with aluminum foil and dried after roll pressing, such that the positive electrode was prepared. In this case, when using the half-cell positive electrode, the positive electrode was prepared so that a loading level (the loading level means that a weight of the positive active material is 5 mg when sampling the aluminum foil coated with the positive active material in a square of 1 $cm^2$) of the positive active material was 5 $mg/cm^2$. When using the full-cell positive electrode, the positive electrode was prepared so that the loading level of the positive active material was 8.5 $mg/cm^2$. Ethylene carbonate and ethyl methyl carbonate (EC:EMC=3:7 v/v) was used as the electrolyte, and vinylene carbonate (VC) of 2 wt % and lithium salt 1.2 mol/L $LiPF_6$ was used as an additive.

The half-cell was prepared as a 2032-coin-type half-cell (hereinafter, referred to as a coin cell) using Li as a negative electrode. The full-cell was prepared using graphite as a negative electrode so that an N/P ratio was 1.15 to 1.20.

(2) Measurement of Charging/Discharging Condition and Impedance.

In respect to the prepared half-cell and the prepared full-cell, the charging/discharging was tested by performing the charging with 4.3 V with a constant current of 90 mA/g (0.5 C) at 30° C. and the discharging with 2.7 V (hereinafter, referred to as 2.7 V to 4.3 V), or the charging/discharging was tested by performing the charging with 4.4 V and the discharging with 2.7 V (hereinafter, referred to as 2.7 V to 4.4 V). In addition, the electrochemical impedance measurement was performed on the prepared coin cell using a multichannel electric potentiostat (Bio-Logic, VMP3) within a frequency rand of 1.0 mHz to 1.0 MHz at a voltage amplitude of 10 mV.

(3) High-Temperature Aging Test for Each Time

In order to analyze degradation of the nickel-rich positive active materials according to Examples 1 and 2 and Comparative Example 1, the high-temperature aging test (accelerated calendar aging test) for each time was performed. The coin cells prepared according to Examples 1 and 2 and Comparative Example 1 were subjected to a primary formation cycle with 18 mA/g (0.1 C) and fully charged up to 4.4 V (4.4 V vs. Li), and then the fully charged positive electrodes were separated. In this case, in order to prevent the separated positive electrode from being contaminated, the separated positive electrode was stored in a polytetrafluoroethylene (PTFE) container having the electrolyte of 20 mL in a glove box under an argon condition. The PTFE container having the separated positive electrode was stored in a chamber at 60° C., and the high-temperature aging test for each time was performed. The completely tested positive electrode was washed with a new electrolyte multiple times and then prepared as a coin cell using a new electrode component in order to perform an electrochemical test (0.1 C-rate).

(4) Cycle Test

A laminate pouch full-cell using mesocarbon microbead graphite (Osaka Gas) as a negative electrode was prepared in order to check long-term cycle performance using the positive electrodes prepared according to Examples 1 and 2 and the comparative example. In this case, the N/P ratio of the full-cell was 1.15 to 1.20. The loading level of the positive active material was approximately 8.5 $mg/cm^2$. The charging/discharging was performed by charging the cell with 4.3 V and discharging the cell to 3.0 V with the constant current of 200 mA/g (1 C) at 25° C. (hereinafter, referred to as 3.0 V to 4.3 V).

4. Results

The following Table 1 shows results of checking chemical components using inductively coupled plasma-optical emission spectroscopy (ICP-OES) and checking capacity characteristics using the half-cell at 2.7 V to 4.4 V in respect to the positive active materials prepared according to Examples 1 to 6 and Comparative Examples 1 to 3.

TABLE 1

| | Chemical composition by ICP-OES | W doping amount [mol %] | Firing temperature [° C.] | (2.7-4.4 V) 0.1 C discharge capacity [mAh $g^{-1}$] | (2.7-4.4 V) Initial coulombic Efficiency [%] | (2.7-4.4 V) 0.5 C discharge capacity [mAh $g^{-1}$] | (2.7-4.4 V) Capacity retention after 50 cycles [%] | (2.7-4.4 V) Capacity retention after 100 cycles [%] |
|---|---|---|---|---|---|---|---|---|
| Example 1 | $Ni_{0.896}Co_{0.047}Mn_{0.047}W_{0.01}$ | 1.0 | 770 | 234.8 | 95.1 | 221.4 | 97.6 | 94.5 |
| Example 2 | $Ni_{0.899}Co_{0.048}Mn_{0.048}W_{0.005}$ | 0.5 | 770 | 234.2 | 95.8 | 224.5 | 94 | 90 |
| Example 3 | $Ni_{0.846}Co_{0.072}Mn_{0.072}W_{0.01}$ | 1.0 | 790 | 229.9 | 95.2 | 215.9 | 98.3 | 96.7 |
| Example 4 | $Ni_{0.849}Co_{0.073}Mn_{0.073}W_{0.005}$ | 0.5 | 790 | 230.1 | 95.9 | 216.4 | 96 | 92.1 |
| Example 5 | $Ni_{0.946}Co_{0.022}Mn_{0.022}W_{0.01}$ | 1.0 | 730 | 238.4 | 95.7 | 225.4 | 95.8 | 92.1 |
| Example 6 | $Ni_{0.949}Co_{0.023}Mn_{0.023}W_{0.005}$ | 0.5 | 730 | 239.2 | 96 | 225.4 | 92.4 | 88 |
| Comparative Example 1 | $Ni_{0.902}Co_{0.049}Mn_{0.049}$ | 0 | 750 | 236.4 | 96.1 | 220.7 | 89.2 | 81 |
| Comparative Example 2 | $Ni_{0.852}Co_{0.074}Mn_{0.074}$ | 0 | 770 | 231.2 | 96 | 215.7 | 91.3 | 84.2 |
| Comparative Example 3 | $Ni_{0.952}Co_{0.024}Mn_{0.024}$ | 0 | 700 | 240.6 | 96.2 | 225.6 | 88.7 | 79 |

Referring to Table 1, it could be ascertained, from the chemical compositions according to the ICP-OES result, that all the positive active materials were prepared as designed according to Examples 1 to 6 and Comparative Examples 1 to 3. It could be ascertained that the initial capacity characteristics according to Examples 1 to 6 and Comparative Examples 1 to 3 were almost similar to one another regardless of the amount of addition of tungsten (W). In contrast, it could be ascertained that after performing 50 cycles and 100 cycles, Examples 1 to 6 have excellent cycle performance in comparison with Comparative Examples 1 to 3. In particular, it could be ascertained that Example 1, Example 3, and Example 5, to which 1 mol % of tungsten (W) was added, were better in cycle performance than Example 2, Example 4, and Example 6 to which 0.5 mol % of tungsten (W) was added, when the nickel (Ni) content remains the same.

Hereinafter, the reason why the example with added tungsten (W) is better in lifespan characteristics than Comparative Example to which no tungsten (W) is added will be described on the basis of Example 1, Example 2, and Comparative Example 3. Because the nickel (Ni) content in Examples 1 and 2 and Comparative Example 3 corresponds to an intermediate value in respect to Examples 3 to 6 and Comparative Examples 2 and 3, the following results by Examples 1 and 2 and Comparative Example 3 will be similar to those by the remaining examples and comparative examples.

The following Table 2 shows results of analyzing average chemical compositions using inductively coupled plasma-optical emission spectroscopy (ICP-OES) in respect to the positive active materials prepared according to Examples 1 and 2 and Comparative Example 1.

TABLE 2

| Classification | | Example 1 (W1-NCM90) | Example 2 (W0.5-NCM90) | Comparative Example (NCM90) |
|---|---|---|---|---|
| Ni | Concentration (ppm) | 55744.64 | 63318.44 | 66987.14 |
| | RSD (%) | 1.106 | 4.186 | 1.499 |
| | Chemical Composition (mol %) | 89.6 | 89.9 | 90.2 |
| Co | Concentration (ppm) | 2936.05 | 3394.55 | 3653.86 |
| | RSD (%) | 3.009 | 1.271 | 3.357 |
| | Chemical Composition (mol %) | 4.7 | 4.8 | 4.9 |
| Mn | Concentration (ppm) | 2737.01 | 3164.43 | 3406.16 |
| | RSD (%) | 1.433 | 2.098 | 3.166 |
| | Chemical Composition (mol %) | 4.7 | 4.8 | 4.9 |
| W | Concentration (ppm) | 1948.70 | 1103.04 | — |
| | RSD (%) | 2.667 | 1.250 | — |
| | Chemical Composition (mol %) | 1.0 | 0.5 | — |

The chemical compositions analyzed with ICP-OES were ascertained such that Example 1 (W1.0-NCM90) was $Li[Ni_{0.896}Co_{0.047}Mn_{0.047}W_{0.01}]O_2$, Example 2 (W0.5-NCM90) was $Li[Ni_{0.899}Co_{0.048}Mn_{0.048}W_{0.005}]O_2$, and Comparative Example 1 (NCM90) was $Li[Ni_{0.902}Co_{0.049}Mn_{0.049}]O_2$, and as a result, it could be ascertained that the positive active materials were synthesized to properly meet the design values.

FIG. 6 is a transmission electron microscope (TEM) image of a crystal structure of the primary particle positioned on the surface of the positive active material according to Example 1 of the present disclosure, and FIG. 7 is a view illustrating a result of observing enlarged regions a, b, c, and d in FIG. 6 with HR TEM. FIG. 8 illustrates a TEM image of the positive active material prepared according to Comparative Example 1, and FIG. 9 illustrates diffraction patterns made by converting the HR TEM images of the regions a, b, and c in FIG. 8 with Fourier filtered transformation (FFT).

Referring to FIGS. 6 and 7, the TEM image of the positive active material prepared according to Example 1 was checked, and the diffraction patterns made by converting the HR TEM images of the regions a to d in FIG. 6 with Fourier filtered transformation (FFT) were shown. It could be ascertained that the spinel structure and the layered structure coexisted in the primary particle positioned on the surface portion among the primary particles constituting the secondary particle.

FIGS. 6 and 7 show states before Example 1 is charged. It could be ascertained that the positive active material according to Example 1 had a different aspect from a positive active material having a layered structure. In general, in the case of the positive active material having the layered structure, when the charging/discharging cycle is performed in a state in which Li+ vacancy exists in a charged state, the spinel structure is locally formed in a case in which the positive active material is left unattended at a high temperature, but no spinel structure is found in a case in which nothing is performed. In contrast, in the case of Example 1, the spinel structure was found in a fresh state immediately after the preparation, and it could be ascertained that the spinel structure was not irregularly formed but formed at the end of the primary particle existing on the surface portion of the secondary particle at a specific position. As a result, it could be ascertained that in the case of Example 1, the layered structure was formed as a whole, and the portion in which the layered structure and the spinel structure coexisted was formed on the surface portion. In contrast, referring to FIGS. 8 and 9, it could be ascertained that in the case of Comparative Example 1, no spinel structure was created, and only the layered structure was provided.

The half-cells were prepared using the positive active materials according to Examples 1 and 2 and Comparative Example 1, discharge capacities were measured under the condition of 0.1 C and 30° C. with voltage cut-off of 2.7 V to 4.3 V, and the cycles were checked with the voltage cut-off under the condition of 2.7 to 4.3 V, 0.5 C, and 30° C. The results thereof are shown in Tables 3, 4, and 5.

TABLE 3

| | 0.1 C, 1st Dis-Capa (mAh/g) | 1st Efficiency | 0.2 C Capacity (mAh/g) | 0.2 C/ 0.1 C | 0.5 C Capacity (mAh/g) | 0.5 C/ 0.1 C | Cycle number | 0.5 C Cycle Retention |
|---|---|---|---|---|---|---|---|---|
| Example 1 | 225.8 | 95.3% | 218.7 | 96.8% | 205.8 | 91.1% | 100 | 97.8% |
| Example2 | 230.6 | 96.2% | 226.0 | 98.0% | 216.8 | 94.0% | 100 | 94.1% |

TABLE 3-continued

| | 0.1 C, 1st Dis-Capa (mAh/g) | 1st Efficiency | 0.2 C Capacity (mAh/g) | 0.2 C/ 0.1 C | 0.5 C Capacity (mAh/g) | 0.5 C/ 0.1 C | Cycle number | 0.5 C Cycle Retention |
|---|---|---|---|---|---|---|---|---|
| Comparative Example 1 | 227.3 | 95.8% | 223.0 | 98.1% | 214.6 | 94.4% | 100 | 84.8% |

TABLE 4

| | Initial discharge capacity [mAh $g^{-1}$] | (2.7-4.3 V) Initial coulombic efficiency [%] | (2.7-4.3 V) 0.5 C discharge capacity [mAh $g^{-1}$] | (2.7-4.3 V) Capacity retention after 50 cycles [%] | (2.7-4.3 V) Capacity retention after 100 cycles [%] |
|---|---|---|---|---|---|
| Example 1 | 225.8 | 94.4 | 205.8 | 98.9 | 97.8 |
| Example 2 | 226.7 | 95.2 | 216.8 | 97.3 | 94.1 |
| Comparative Example 1 | 228.2 | 96.2 | 214.6 | 92.4 | 84.8 |

TABLE 5

| | (2.7-4.4 V) 0.1 C discharge capacity [mAh $g^{-1}$] | (2.7-4.4 V) Initial coulombic Efficiency [%] | (2.7-4.4 V) 0.5 C discharge capacity [mAh $g^{-1}$] | (2.7-4.4 V) Capacity retention after 50 cycles [%] | (2.7-4.4 V) Capacity retention after 100 cycles [%] |
|---|---|---|---|---|---|
| Example 1 | 234.8 | 95.1 | 221.4 | 97.6 | 94.5 |
| Example 2 | 234.2 | 95.8 | 224.5 | 94 | 90 |
| Comparative Example 1 | 236.4 | 96.1 | 220.7 | 89.2 | 81 |

It can be seen from Tables 3 to 5 that the half-cells prepared using the positive active materials according to Examples 1 and 2 are significantly excellent in discharge capacity characteristics and lifespan characteristics in comparison with the half-cell prepared using the positive active material according to Comparative Example 1.

Table 4 shows a result of performing the cycle with 2.7 V to 4.3 V, and Table 5 shows a result of performing the cycle with 2.7 V to 4.4 V. It can be ascertained that both the positive electrode according to Example 1, which was subjected to the cycle performed by charging the positive electrode with up to 4.3 V, and the positive electrode according to Example 2, which was subjected to the cycle performed by charging the positive electrode with up to 4.4 V, are excellent in comparison with the positive electrode according to Comparative Example 1.

FIGS. 10A to 10C illustrates SEM images of the particles according to Comparative Example 1 and Examples 1 and 2 of the present disclosure. Referring to FIGS. 10A to 10C, it can be ascertained that thicknesses of the primary particles become smaller in the order of Comparative Example 1, Example 2, Example 1, as tungsten (W), which is the doping element, is added. In addition, as a result of analyzing surface areas using BET, it can be ascertained that the specific surface areas of Examples 1 and 2 and Comparative Example 1 are 0.388 $m^2/g$, 0.351 $m^2/g$, and 0.315 $m^2/g$, respectively. That is, it can be ascertained that the specific surface area of Example 1 doped with the largest amount of tungsten has the largest value and the specific surface area of Comparative Example 1 has the smallest value.

FIG. 11 is an XRD graph according to Comparative Example 1 and Examples 1 and 2 of the present disclosure and illustrates a region from 35° to 45°. In FIG. 11, the first graph shows XRD patterns representing the peak intensity ratio (003)/(104) of Example 1 (W1.0-NCM90), Example 2 (W0.5-NCM90), and Comparative Example 1 (NCM90), and the second graph shows an enlarged, selected range from 35° to 45°.

Referring to FIG. 11, it can be ascertained that the peak intensity ratio (003)/(104) decreases in a manner of 1.89→1.60→1.27 as the tungsten (W)의 content, which is the doping element contents, increases. In addition, it can be ascertained that in (018) and (110) in the XRD peak, two peaks of NCM90, which is Comparative Example 1, are clearly split, and thus the layered shape is clearly created. In contrast, it can be ascertained that the above-mentioned situation disappears when the positive active material is doped with tungsten (W), like Examples 1 and 2. This does not mean that the structures according to Examples 1 and 2 are changed to other structures instead of the layered structure by being doped with tungsten (W), but means an additional effect created during the XRD analysis as the thickness of the primary particle constituting the secondary particle decreases.

Specifically, in the positive active materials according to Examples 1 and 2 and Comparative Example 1, the XRD patterns have no impurity phases, but represent hexahedral crystal structures having R m space groups. The first graph in FIG. 12 shows that the (108)/(110) peaks of the XRD patterns are clearly separated, and thus Comparative Example 1 has high crystallinity. In contrast, there is a tendency that the (108) and (110) peaks are gradually merged in Examples 1 and 2. In addition, in the nickel-rich NCM positive active material different from $LiNiO_2$, there is a tendency that the (003)/(104) peak intensity ratios, which represent degrees to which the positive electrodes are mixed, gradually decrease, such that the (003)/(104) peak intensity ratios are 1.89 in the comparative example, 1.60 in Example 2, and 1.27 in Example 1. This shows that a degree (cation mixing) to which cations are mixed increases similarly to a degree to which the positive active material is doped with tungsten (W). The Rietveld refinement of the XRD pattern, which represents tungsten (W) exclusively occupying a transition metal place 3b, show that the degree to which the cations are mixed corresponds to the decrease in (003)/(104) peak intensity ratios according to Examples 1 and 2 and Comparative Example 1 (1.77% in Comparative Example 1, 2.50% in Example 2, and 4.44% in Example 1).

As described above, $W^{6+}$ is introduced into the transition metal place in the positive active material as the positive active material is doped with tungsten (W), such that $Ni^{2+}$ is essentially created to maintain the charging balance. $Ni^{2+}$ has an ion radius similar to that of Li+($r_{Ni3+}$=0.56 Å, $r_{Ni2+}$=0.69 Å, and $r_{Li+}$=0.72 Å), and in the case of the nickel-rich positive active material, $Ni^{2+}$ having a relatively high content is moved to the Li layer. In addition, in the transition metal place, $Ni^{2+}$ having a larger ion radius than $Ni^{2+}$ increases a volume of a unit cell.

As shown in the second graph in FIG. 11, it can be ascertained that the peak of the enlarged XRD pattern expands to both sides, and this means that the peak expands in proportion to a fraction of doping tungsten (W).

FIG. 12 illustrates an STEM image (left upper end), a TEM image (middle upper end), an HR-TEM image (left lower end), and an FT image (right upper end and right lower end) of Example 1 of the present disclosure. As illustrated in FIG. 12, the transmission electron microscopy (TEM) analysis was performed in order to more specifically check crystallinity of the first primary particle according to Example 1 that was observed with the XRD. The primary particle, which was provided on the outermost surface of the secondary particle, was selected and then crystallinity of the entire selected primary particle was checked with an SAED pattern.

The STEM image of Example 1 shows that the primary particles are significantly small and densely agglomerated at the center portion of the secondary particle than on the surface portion of the secondary particle, and this corresponds to SEM and XRD results. The TEM image of the primary particle on the surface portion of the secondary particle according to Example 1 and the SAED (100-zone selected-area electron diffraction) pattern in the indicated region show that the primary particle has a thin and long shape, a longitudinal axis of the primary particle is parallel to an a-direction of the unit cell. The SAED pattern has an additional dim point (indicated by the yellow circle) that does not appear in an R□m space group. The additional diffraction point, which is dimly shown, indicates that one of strong cation ordering and crystal symmetry changing exists locally.

According to a result of checking the region shown at a left lower end in FIG. 12 with 100-zone high-resolution TEM, it could be ascertained that a lattice fringe appearing on the surface portion of the secondary particle was different from a 100-zone image of a general layered structure. Based on the Fourier-transformed (FT) image of the surface portion of Example 1, it could be ascertained that the first image (I region) at the left lower end had a Fd3m spinel structure. It could be ascertained that the FT image in the II region positioned in the vicinity of the I region had a weaker diffraction point than in the I region, and in the III region positioned further below the above-mentioned region, the additional peak completely disappeared and only the R□m diffraction pattern appeared. That is, it could be ascertained that the end of the primary particle according to Example 1 included a portion structurally deformed by tungsten (W) doping and the portion was formed at a depth of about 30 nm from the end of the primary particle.

In general, as checked in Example 1, it is known that the layered structure has the spinel structure partially formed by the collapse of the structure and this mainly occurs due to a defective oxygen place caused by the generation of oxygen. In addition, the spinel structure is formed on the layered structure when the cycle is performed at a high rate on the secondary battery using the nickel-rich NCM positive active material. As described above, the situation in which the spinel structure is partially formed on the layered structure means structural degradation of the positive electrode.

In contrast, the spinel structure observed in the positive active material identical to the positive active material according to Example 1 is generated before performing the cycle and has a shape different from a shape made by the structural degradation of the nickel-rich NCM positive active material having a typical layered structure. It is determined that the spinel structure is formed as lithium (Li) ions and nickel (Ni) ions are partially mixed in the structure in an intermediate state between the layered structure and a rock salt structure.

That is, it could be ascertained that in Example 1, the first primary particle, which is provided on the surface of the secondary particle and has the spinel structure at the end thereof, entirely has the layered structure and the spinel structure uniformly exist in the first region which is the end of the first primary particle. It was ascertained that the first region is provided at an approximately 30 nm from the outermost surface of the first primary particle in a depth direction.

FIG. 13 is a view illustrating respective using electron diffraction patterns. Referring to FIG. 13, the spinel structure or the rock salt structure (rock salt phase) may be formed by cation intermixing. Based on a degree of the cation intermixing, a phase of the structure of the positive active material having the layered structure is changed in a manner of the layered structure→the cation ordering structure (cation-ordered)→the spinel structure→the rock salt structure.

The layered structure illustrated at the left lower end in FIG. 13 shows that lithium and transition metal exist separately, and the rock salt structure illustrated at the right lower end in FIG. 13 shows that lithium and transition metal are irregularly mixed in the structure. The spinel structure according to Example 1, which is positioned on the surface portion of the secondary particle and provided at the end of the primary particle, is closer to the rock salt structure than the layered structure independently formed and illustrated at the upper end in FIG. 13, such that it is determined that the spinel structure, in which lithium ions and transition metal ions are partially mixed, may improve cycle stability by stabilizing the surface of the secondary particle.

FIG. 14 illustrates dQ/dV graphs illustrating charge/discharge characteristics at 4.4 V and illustrating changes in volumes according to cell voltages in respect to the positive active materials according to Comparative Example 1 and Examples 1 and 2 of the present disclosure.

FIG. 14 illustrates a result of evaluating the half-cell. Capacities were checked by performing primary charging/discharging on Comparative Example 1 and Examples 1 and 2 with the 0.1 C constant current under a 2.7 V discharging and 4.3 V or 4.4 V charging condition at 30° C., and cycle characteristics were checked by performing the cycle at 0.5 C (90 mA). Table 6 shows lattice parameters in accordance with charging voltages measured by in-situ XRD in Example 1 and Comparative Example 1.

TABLE 6

| | Lattice parameter | 3.6 V [Å] | 3.8 V [Å] | Lattice parameter deviation when charged to 3.8 V [%] | 4.0 V [Å] | Lattice parameter deviation when charged to 4.0 V [%] | 4.2 V [Å] | Lattice parameter deviation when charged to 4.2 V [%] | 4.4 V [Å] | Lattice parameter deviation when charged to 4.4 V [%] |
|---|---|---|---|---|---|---|---|---|---|---|
| Example 1 | a-axis | 2.87518 | 2.84517 | −1.0 | 2.8269 | −1.7 | 2.81734 | −2.0 | 2.81371 | −2.1 |
| | c-axis | 14.19807 | 14.31773 | 0.8 | 14.41172 | 1.5 | 14.26993 | 0.5 | 13.78072 | −2.9 |
| | unit cell volume | 101.6459 | 100.4801 | −1.1 | 99.74165 | −1.9 | 98.09141 | −3.5 | 94.48464 | −7.0 |
| Comparative Example 1 | a-axis | 2.87273 | 2.84135 | −1.1 | 2.8229 | −1.7 | 2.81351 | −2.1 | 2.81193 | −2.1 |
| | c-axis | 14.1984 | 14.36301 | 1.2 | 14.4507 | 1.8 | 14.07451 | −0.9 | 13.68187 | −3.6 |
| | unit cell volume | 101.4751 | 100.4213 | −1.0 | 99.7258 | −1.7 | 96.48509 | −4.9 | 93.68811 | −7.7 |

Referring to FIG. 14, it can be ascertained that 4.4 V may implement a higher capacity than 4.3 V and both 4.4 V and 4.3 V implement excellent cycle characteristics as the tungsten (W) content increases. In addition, referring to the dQ/dV graph, it could be ascertained that when checking the capacity (1 cycle) once and the capacity (1 cycle) 100 times, the H2-H3 phase transition is almost similar in Example 1, whereas there is a difference in Comparative Example 1. In addition, it can be ascertained that in the in-situ XRD, in a 4.2 V region in which the micro-crack is mainly formed and a lifespan begins to deteriorate, the cell contraction in Example 1 is reduced in comparison with that in the Comparative Example 1.

Specifically, it can be ascertained that in Examples 1 and 2 and Comparative Example 1 at 4.3 V, the 0.1 C discharge capacity slightly decreases as the fraction of doping tungsten (W) increases, and Examples 1 and 2 have excellent cycle characteristics in comparison with Comparative Example 1. In addition, after the 100 cycles, Examples 1 and 2 have capacity retention rates of 96.0% and 93.0%, respectively, whereas Comparative Example 1 has a capacity retention rate of 86.0%.

It can be ascertained that at 4.4 V in FIG. 14, the positive electrode has a discharge capacity of 235 mAh/g regardless of a degree to which the positive electrode is doped with tungsten. In addition, it can be ascertained that in the case of cycle characteristics at 4.4 V, after the 100 cycles, the Comparative Example 1 has the capacity retention rate of 81.0%, whereas Example 1 has the capacity retention rate of 94.5% and Example 2 has the capacity retention rate of 90.0%.

In general, one of the main causes of the sudden decrease in capacity of the positive active material of the nickel-rich layered structure that occurs during the process of performing the cycle is an increase in micro-crack in the secondary particle, and it is known that the micro-crack is caused by a sudden change in anisotropic volume in the final step during charging.

In order to check this, a difference between charging/discharging curves in the dQ/dV graph was calculated in order to compare phase transition forms (in particular, H2→H3) of Comparative Example 1 and Examples 1 and 2. Comparative Example 1 undergoes a continuous phase change of H1 (hexagonal 1)→M (monoclinic)→H2→(hexagonal 2)→H3 (hexagonal 3) in the charging process. In this case, the final H2→H3 greatly affects a sudden change in anisotropic volume. Comparative Example 1, in which the intensity of the peak representing the H2→H3 phase transition during the process of performing the cycle is rapidly decreased, means damage to an irreversible structural caused by a change in anisotropic volume of the NCM90 positive active material. In contrast, it can be ascertained that in Example 1 (W1.0-NCM90), the intensity of the peak of the phase transition of H2→H3 is constant without being changed during the 100 cycles.

In order to quantify a change in lattice volume of the positive active material during the charging process, in-situ XRD experiments were performed during the process of charging the positive electrodes according to Example 1 and Comparative Example 1 with up to 4.4 V with 0.2 C constant current. When checking a change in unit cell volume calculated using the in-situ XRD data (at the left side in FIG. 14), the unit cell volumes in Comparative Example 1 and Example 1 gradually increase to 4.15 V which is the voltage before the H2→H3 phase transition begins, and the unit cell volumes of the positive active materials of both Comparative Example 1 and Example 1 rapidly decreases from 4.2 V at which the H2→H3 phase transition begins. The unit cell volume in Comparative Example 1 decreases by −5.2% before full charging with 4.4 V from the beginning of the H2→H3 phase transition (4.15 V), and in the same state, the unit cell volume in Example 1 relatively slightly decreases by −4.4%.

As described above, in order to check the contraction behavior of the unit cell volume, the contraction and expansion behavior of the a-axis and the c-axis is converted into a volume. In Comparative Example 1 and Example 1, the sudden decrease in volume provides great strain to mechanical stability of the positive electrode, the sudden decrease in volume is not solved, and local stress is concentrated, which causes a change in anisotropic volume. This finally causes the micro-crack, and the H2→H3 phase transition, which causes the mechanical strain, is reduced in Example 1 in comparison with Comparative Example 1, and as a result, the high capacity retention rate may be implemented even after many cycles are performed. In addition, it can be ascertained that between Comparative Example 1 and Example 1, Example 1 is more advantageous in change in volume even at 4.4 V which is a high cut-off voltage.

FIG. 15 illustrates dQ/dV graphs and SEM images and illustrating cross sections after charging Comparative Example 1 and Example 1 of the present disclosure at 4.11 V, 4.3 V, and 4.5 V.

In FIG. 15, a sample prepared after being primarily charged is used. Referring to FIG. 16, according to the result of checking Comparative Example 1 (the image at the upper end) and Example 1 (the image at the lower end) by performing charging while increasing the electric potential to 4.11 V, 4.3 V, and 4.5 V, it could be ascertained that in Comparative Example 1, the micro-crack was created at 4.3

V and the micro-crack was increased at 4.5 V. In contrast, in the case of Example 1, it could be ascertained that no micro-crack was created at both 4.3 V and 4.5 V.

At 4.11 V before the H2→H3 phase transition, a fine hair line, which was created from the center of the secondary particle, finely appeared in Comparative Example 1, but no micro-crack was created in both Comparative Example 1 and Example 1. In contrast, at 4.3 V after the H2→H3 phase transition, the micro-crack was created in Comparative Example 1, but no micro-crack was created in Example 1. In comparison with Example 1, the micro-crack is created in the entire secondary particle in Comparative Example 1, and particularly, the severe micro-crack is created at the center portion of the secondary particle. As described above, in Comparative Example 1, the micro-crack, which is severely created at the center portion, propagates to the surface of the secondary particle, and as a result, a micro-channel through which the electrolyte may permeate into the center portion of the secondary particle, is created. The electrolyte permeates into the secondary particle through the micro-channel, and the permeating electrolyte attacks the inner surface of the secondary particle and forms an impurity layer with high resistance during the process of performing the cycle, thereby reducing the electronic conductivity.

The secondary particle was almost damaged by the micro-crack in Comparative Example 1 charged with 4.5 V, but the micro-crack was not observed in the case of Example 1. That is, it can be ascertained that in Example 1, the tungsten (W) doping reduces the H2→H3 phase transition and thus minimizes local concentration of strain, thereby inhibiting the creation of the micro-crack.

Table 7 is a graph illustrating resistance values of Example 1 and Comparative Example 1 in accordance with the charging/discharging voltage and the number of cycles.

TABLE 7

| | Cut-off voltage [V] | Resistance | $1^{th}$ [Ω] | $25^{th}$ [Ω] | $50^{th}$ [Ω] | $75^{th}$ [Ω] | $100^{th}$ [Ω] |
|---|---|---|---|---|---|---|---|
| Example 1 | 2.7 V- | Rsf | 6.22 | 6.37 | 6.35 | 6.4 | 7 |
| | 4.3 V | Rct | 3.67 | 7.67 | 14.39 | 18.82 | 24.27 |
| | 2.7 V- | Rsf | 6.23 | 6.37 | 6.58 | 7.03 | 7.35 |
| | 4.4 V | Rct | 3.72 | 13.33 | 19.26 | 23.19 | 29.82 |
| Comparative | 2.7 V- | Rsf | 8.31 | 7.59 | 8.11 | 8.31 | 8.2 |
| Example 1 | 4.3 V | Rct | 14.13 | 32.38 | 48.12 | 62.08 | 74.91 |
| | 2.7 V- | Rsf | 6.01 | 6.17 | 6.33 | 6.4 | 6.44 |
| | 4.4 V | Rct | 43.43 | 64.16 | 77.03 | 86.45 | 102.4 |

Referring to Table 7, resistance was measured at an interval of 25 cycles while performing the cycles on the positive active materials using Comparative Example 1 and Example 1. As a result of calculating Rsf and Rct based on a Nyquist plot in Table 6, there was a performance difference in Rct value between Comparative Example 1 and Example 1 even in the case in which the cycle was performed by performing charging at 4.3 V. However, it could be ascertained that there was a great difference at 4.4 V. In contrast, it could be ascertained that there was no great difference in Rsf value.

It could be ascertained that in Example 1, the tungsten (W) doping greatly reduced impedance of the positive electrode at 4.3 V and 4.4 V. When comparing Example 1 and Comparative Example 1, it can be ascertained that the relative impedance difference further increases as the cut-off voltage increases from 4.3 V to 4.4 V.

That is, it could be ascertained that during the process of performing the cycle, the resistance Rsf, which was surface film resistance of the positive electrodes of Example 1 and Comparative Example 1, was almost constant, whereas the charge transfer resistance Rct was greatly changed. It could be ascertained that Rct of Comparative Example 1 in the 4.3 V cycle was increased by 60.8Ω (14.1Ω→74.9Ω), whereas Rct of Example 1 was lower than that of Comparative Example 1 and the amount of change was as relatively small as 20.6Ω (3.7Ω→24.3Ω) even after the cycle. In addition, it could be ascertained that Example 1 was increased only by about 5.6Ω at 4.4 V in comparison with 4.3 V, Comparative Example 1 was increased by 27.5Ω, such that there was a great difference between Example 1 and Comparative Example 1, and Comparative Example 1 had high values during the cycle.

As described above, in Example 1, the micro-crack is inhibited during the cycle process, the permeation of the electrolyte is prevented, and there is no damage to the inside of the secondary particle. In contrast, in Comparative Example 1, the micro-crack gradually increases during the cycle process, and the impedance gradually increases when the electrolyte permeates. In addition, it could be ascertained that in an initial step of the cycle, the relatively low Rct of Example 1 minimizes the influence of the electrolyte by the spinel structure provided in advance on the surface portion of the secondary particle before the charging/discharging, thereby contributing to stabilization of surface chemistry.

Table 8 shows results of differential scanning calorimetry (DSC) of Comparative Example 1 and Example 1 of the present disclosure.

TABLE 8

| | Cut-off voltage [V] | Peak temperature [° C.] | Enthalpy [J/g] |
|---|---|---|---|
| Example 1 | 2.7-4.3 | 201.9 | 1027 |
| | 2.7-4.4 | 198.6 | 1442 |
| Comparative | 2.7-4.3 | 191.2 | 1243 |
| Example 1 | 2.7-4.4 | 186.8 | 1865 |

In Table 8, Comparative Example 1 and Examples 1 and 2 were checked using 1.2 M $LiPF_6$ of the electrolyte, EC/EMC (3:7 v:v), and 2 wt % VC by being charged with 4.3 V and 4.4 V. It could be ascertained that thermal safety deteriorated when the positive active material was charged with 4.4 V in comparison with when the positive active material was charged with 4.3 V and a degree to which the thermal safety deteriorated was lower in Example 1 than in Comparative Example 1. That is, it could be ascertained that Example 1 to which tungsten (W) was added was excellent in thermal safety in comparison with Comparative Example 1, and the degree to which the thermal safety deteriorated was low in the case in which the positive active material was charged with a high voltage.

Specifically, at 4.3 V, Comparative Example 1 had a high exothermal peak of 191.2° C. and generated heat of 1,243 J/g, whereas Example 1 generated very low reaction heat 1,027 J/g, and the beginning of the thermal reaction was relatively delayed as 201.9° C.

It could be ascertained that at 4.4 V, the exothermal peak of Comparative Example 1 was 186.8° C. (1,865 J/g), and the exothermal peak of Example 1 was 198.6° C. (1,442 J/g), such that there was a great difference in comparison with the case in which the voltage was 4.3 V. The exothermic reaction is mainly generated on the surface portion of the secondary particle exposed to the electrolyte, and it is determined that Example 1 has the thermal stability improved by the spinel structure provided on the surface portion of the secondary particle. In addition, the spinel structure of Example 1 inhibits the micro-crack, prevents the electrolyte from permeating into the secondary particle, and thus reduces the contact between the electrolyte and the secondary particle. The thermal stability means that the spinel structure of Example 1 improves not only the chemical stability, but also the mechanical stability.

Table 9 shows results of checking Comparative Example 1 and Example 1 of the present disclosure and checking the capacity after performing high temperature aging tests at 60° C. for three days, seven days, and fifteen days, and FIG. 16 illustrates results of checking SEM images after completely discharging Comparative Example 1 and Example 1 of the present disclosure.

TABLE 9

| | Capacity before storage [mAh $g^{-1}$] | Capacity after 7 days of storage [mAh $g^{-1}$] | Capacity retention after 7 days of storage [%] | Capacity after 15 days of storage [mAh $g^{-1}$] | Capacity retention after 15 days of storage [%] |
|---|---|---|---|---|---|
| Example 1 | 234.8 | 208.1 | 88.7 | 178.5 | 76.1 |
| Comparative Example 1 | 236.4 | 190.1 | 80.4 | 143.2 | 60.5 |

Referring to Table 9 and FIG. 16, chemical stability of Example 1 and Comparative Example 1 were checked by performing the high-temperature aging test (accelerated thermal aging test) for each time. In Comparative Example 1 and Example 1, the capacity decreases as the impregnation time increases to three days, seven days, and fifteen days. However, a degree to which the capacity decreases is smaller in Example 1 than in Comparative Example 1. In addition, referring to a cross-sectional SEM image captured after discharging, it could be ascertained that the micro-crack increased as the time increased in Comparative Example 1, whereas almost no micro-crack was created even as the time increased in Example 1.

Typically, the capacity of the positive electrode having the nickel-rich layered structure also decreases in proportion to an increase in time for which the positive electrode is left unattended during the high-temperature aging test, and similar nickel impurity phases and emission of oxygen are increased, which causes a structural problem.

The positive electrodes of Comparative Example 1 and Example 1, which were fully charged and severely delithiated, were impregnated with the electrolyte identical to the electrolyte used for the cycle and stored at 60° C. for three days, seven days, and fifteen days. Thereafter, according to the result of checking the capacity of the coin-type half-cell prepared using components such as a new negative electrode in accordance with Comparative Example 1 and Example 1, Comparative Example 1 had a capacity loss of 19.6% after seven days and a capacity loss of 39.5% after fifteen days in comparison with the initial capacity, whereas Example 1 only had a capacity loss of 11.3% after seven days and a capacity loss of 23.9% of fifteen days in comparison with the initial capacity.

Referring to the SEM images of Example 1 and Comparative Example 1 according to the high-temperature aging test for each time, the micro-crack, which traversed the surface portion of the secondary particle, was created after three days, and the micro-crack, such as a hair line, was finely created along a boundary between the primary particles in the secondary particle in Comparative Example 1. In contrast, in Comparative Example 1, the micro-crack was created and the primary particles were separated from one another after seven days. Finally, after fifteen days, the large micro-cracks were created in both the surface portion and the center portion of the secondary particle, and the secondary particle was observed as being almost damaged.

As the time for which Comparative Example 1 is stored in the high-temperature electrolyte is increased, the structural stability of the positive electrode is consistently decreased, and thus the mechanical stability is also decreased. In contrast, it could be ascertained that in Example 1, the tungsten (W) doping maintained the chemical stability even though the positive electrode was exposed to the high-temperature electrolyte for a long period of time, such that the surface portion of the secondary particle might be stably protected and the initial state was almost maintained even after fifteen days.

Table 10 shows dQ/dV graphs indicating results of checking pouch full-cells prepared using Comparative Example 1 and Example 1 of the present disclosure and checking the capacity in accordance with the cycle at 4.3 V, cross-sectional SEM images after performing 500 cycles, and 2θ contour plots selected to correspond to (003) peaks (reflection).

TABLE 10

| | (2.7-4.3 V) 1.0 C discharge capacity [mAh $g^{-1}$] | (2.7-4.3 V) Capacity retention after 250 cycles [%] | (2.7-4.3 V) Capacity retention after 500 cycles [%] | Nominal voltage at $1^{st}$ cycle [V] | Nominal voltage at $250^{th}$ cycle [V] | Nominal voltage at $500^{th}$ cycle [V] |
|---|---|---|---|---|---|---|
| Example 1 | 195.8 | 95.3 | 88.9 | 3.69 | 3.7 | 3.67 |
| Comparative Example 1 | 202 | 81.2 | 55.8 | 3.71 | 3.61 | 3.43 |

Referring to Table 10, according to a result of checking charging/discharging from 4.3 V (negative electrode graphite) corresponding to 4.4 V to the full-cell, it could be ascertained that the coin cell of Li+/Li having high electric potential had excellent lifespan characteristics up to the 500 cycles in Example 1. Likewise, it could be ascertained that in Example 1, the H2→H3 phase transition was maintained without being changed even after the 500 cycles and no micro-crack was created. In contrast, it could be ascertained that in Comparative Example 1 unlike Example 1, the cell was degraded as the charging/discharging was performed, the lifespan characteristics deteriorated, and micro-cracks were created in the SEM image after the 500 cycles.

The fluorescent curves were measured with in-situ XRD in respect to Example 1 and Comparative Example 1 after performing the 1 cycle, the 250 cycles, and the 500 cycles. It could be ascertained that in Example 1, the (003) peak was shifted even though the cycle was performed, but the peak was maintained without becoming dim as the cycles were performed. That is, in Example 1, the phase transition is smoothly maintained, and lifespan characteristics are excellent.

FIG. 17 illustrates dQ/dV graphs indicating results of checking pouch full-cells prepared using Comparative Example 1 and Example 1 of the present disclosure, SEM cross-sectional images after performing 500 cycles, and 2θ contour plots selected to correspond to (003) peaks (reflection).

FIG. 17 illustrates a contour plot in respect to selected 2θ corresponding to the (003) peak. During the charging process, the (003) peak moves to the left at the initial time, and a $(003)_{H2}$ peak of Comparative Example 1 moves to a $(003)_{H3}$ peak at an angle higher by approximately 1.4° at 4.0V (to 18.3°) or more at which the H2→H3 phase transition begins. After charging, the $(003)_{H3}$ peak (to 19.7°) symmetrically returns to the initial position (to 18.7°), and this means that the phase is reversibly changed in the primary cycle. In contrast, in Comparative Example 1, the movement of the $(003)_{H2}$ peak gradually disappears while the cycles are performed, and the movement of the $(003)_{H2}$ peak almost disappears in the 500 cycles. This means that the H2→H3 phase transition peak intensity of the cation rapidly decreases. The behavior of the $(003)_{H3}$ peak may be interpreted as a loss of the H2→H3 phase transition as well as a capacity loss. The plurality of micro-cracks was created in the secondary particle of the positive electrode of Comparative Example 1 due to the repeated change in anisotropic volume, and thus the secondary particle was in a state immediately before the secondary particle was almost crushed.

In the case of Example 1, the H2→H3 phase transition peak moved from 18.3° to 19.7° without decreasing intensity, and there was observed no degradation of the movement of the peak. That is, it can be ascertained that Example 1 exhibits excellent mechanical stability even though the cycles are performed for a long period of time, and this is interpreted as being similar to the case in which no micro-crack is created even in the transverse section of the secondary particle after the 500 cycles. This is determined as being derived from the effect of the tungsten (W) doping.

Table 11 shows XRD results of Comparative Example 1 and Examples 1 and 2 of the present disclosure.

TABLE 11

| | a-axis [Å] | c-axis [Å] | volume [$Å^3$] | Li1 (3a) occupancy [%] | Ni2 (3a) occupancy [%] | Ni1 (3b) occupancy [%] | $R_p$ [%] | $R_{wp}$ [%] | $R_{exp}$ [%] | $Chi^2$ |
|---|---|---|---|---|---|---|---|---|---|---|
| Example 1 | 2.87668 (8) | 14.1986 (4) | 101.755 (5) | 0.9556 | 0.0444 | 0.8456 | 7.43 | 10.3 | 4.16 | 6.23 |
| Example 2 | 2.87526 (0) | 14.1992 (30 | 101.659 (9) | 0.975 | 0.025 | 0.87 | 7.33 | 9.94 | 4.12 | 6.23 |
| Comparative Example 1 | 2.87423 (2) | 14.2018 (1) | 101.605 (5) | 0.9823 | 0.0177 | 0.8823 | 7.86 | 10.7 | 4.35 | 6.23 |

Referring to Table 11, it could be ascertained that there was a tendency that as the tungsten (W) content increased, a length of a gradually increased, whereas a length of c gradually decreased, and a volume of the unit cell gradually increased. In addition, according to a result of checking a ratio, which is a numerical value representing the degree of cation mixing, when $Ni^{2+}$ ions were placed at the 3a site instead of the 3b site, it could be ascertained that as the tungsten (W) content increased, the ratios increased in the order of 1.77% (Comparative Example 1), 2.50% (Example 2), and 4.44% (Example 1). This is similar to the behavior in which the (003)/(104) intensity ratios at the XRD peaks gradually decrease in the order of Comparative Example 1, Example 2, and Example 1, and the degree of cation mixing increases as the (003)/(104) intensity ratio decreases.

That is, it can be ascertained that the positive active material for a lithium secondary battery according to the present embodiment, which has the layered structure including the spinel structure provided at the end of the first primary particle and to which tungsten (W) is added, is excellent in maintenance, lifespan characteristics, and thermal characteristics at a high temperature in comparison with the comparative example. This is because in the case of Comparative Example 1, the H2-H3 phase transition is reversible and lifespan degradation or the like occurs due to the creation of the micro-crack as the charging/discharging is performed. In contrast, in the case of Examples 1 and 2, it can be ascertained that the H2-H3 phase transition is reversibly performed even at a high voltage of 4.4 V and there is a stable situation in which no micro-crack is created.

While the present disclosure has been described in detail with reference to the exemplary embodiments, the scope of the present disclosure is not limited to the specific embodiment and should be defined by the appended claims. It should also be understood by those skilled in the art that various modifications and alterations may be made without departing from the scope of the present disclosure.

The invention claimed is:

1. A positive active material for a lithium secondary battery, the positive active material comprising:

a secondary particle comprising a group of a plurality of primary particles, wherein the primary particles comprise a first primary particles provided on a surface portion of the secondary particle, and the primary particle is made of lithium (Li), nickel (Ni), cobalt (Co), manganese (Mn), and tungsten (W), which is a doping element, and wherein the secondary particle has a chemical formula $Li_x(Ni_yM_{1-y-z}W_z)O_2$, wherein Mis Co and Mn, x is 0.9 to 1.2, y is 0.85 to 0.95, and z is 0.005 to 0.02, a concentration of W varies within the secondary particle, wherein the primary particle has a layered structure and comprises a spinel structure in a first region which is the end of the first primary particle, and wherein the first primary particle has a transverse section having a flake shape having a major axis and a minor axis, and the first region accounts for 0.5% to 4% of an average length of the major axis of the first primary particle.

2. The positive active material of claim 1, wherein the first region is formed at a depth of 5 nm to 50 nm inward from an outermost surface of the first primary particle.

3. The positive active material of claim 1, wherein the secondary particle is formed in a spherical shape, and the first region accounts for 0.2% to 1.3% of an average radius of the secondary particle in a direction from the outermost surface to a center of the secondary particle.

4. The positive active material of claim 1, wherein the positive active material has a concentration gradient of W, as a tungsten content in the positive active material increases, an area of the first region of the first primary particle increases, a length of a lattice parameter a increases, and a length of a lattice parameter c decreases.

5. The positive active material of claim 1, wherein a BET specific surface area of the secondary particle is 0.15 $m^2/g$ to 0.6 $m^2/g$, and the BET specific surface area increases as a tungsten content increases.

6. The positive active material of claim 1, wherein in an X-ray diffraction pattern measured by a powder X-ray diffraction device (XRD) using a CuKα1 ray, a peak intensity ratio (003)/(104) of intensity of peak ascribed to (003) plane to intensity of peak ascribed to (104) plane is 1.05 to 1.75, and the peak intensity ratio (003)/(104) decreases as the amount of addition of the doping element increases.

7. The positive active material of claim 1, wherein an exothermal peak of 190° C. to 220° C. is obtained during a differential scanning calorimetry (DSC) analysis after charging is performed with a constant current at 4.4V cut-off.

8. The positive active material of claim 1, wherein the spinel structure provided in the first region is formed before initial charging is performed.

9. The positive active material of claim 1, wherein based on a total amount of nickel (Ni), cobalt (Co), manganese (Mn), and tungsten (W) which is the doping element, nickel (Ni) accounts for 85 mol % or more, and tungsten (W), which is the doping element, accounts for 0.1 mol % to 2 mol %.

10. The positive active material of claim 8, wherein nickel (Ni) accounts for 90 mol % or more.

11. A positive electrode for a secondary battery, comprising the positive active material for a lithium secondary battery according to claim 1.

12. A lithium secondary battery comprising:

the positive electrode according to claim 11;

a negative electrode made of graphite or lithium metal; and an electrolyte.

13. The lithium secondary battery of claim 12, wherein when the negative electrode is made of graphite, a capacity retention rate with respect to an initial capacity is 80% or more after 500 cycles charging and discharging is performed at 3.0 V to 4.3 V at room temperature.

14. A battery module comprising the lithium secondary battery according to claim 12 as a unit cell.

15. A battery pack comprising the battery module according to claim 14, wherein the battery pack is used as a power source for medium and large devices, and the medium and large devices are selected from a group consisting of an electric vehicle, a hybrid electric vehicle, a plug-in hybrid electric vehicle, and an electric power storage system.

* * * * *